US007354655B2

(12) United States Patent
Yamaguchi et al.

(10) Patent No.: US 7,354,655 B2
(45) Date of Patent: Apr. 8, 2008

(54) ADHESIVE RESIN COMPOSITION AND MULTI-LAYER LAMINATED STRUCTURE USING THE SAME

(75) Inventors: Tatsuo Yamaguchi, Tokyo (JP); Shinji Miwa, Kawasaki (JP); Fumio Asada, Kawasaki (JP); Kenichi Hiraki, Shiojiri (JP); Naoki Minorikawa, Naka-gun (JP)

(73) Assignee: Japan Polyolefins Co., Ltd., Tokyo (JP)

( * ) Notice: Subject to any disclaimer, the term of this patent is extended or adjusted under 35 U.S.C. 154(b) by 0 days.

(21) Appl. No.: 10/303,848

(22) Filed: Nov. 26, 2002

(65) Prior Publication Data

US 2003/0175538 A1    Sep. 18, 2003

Related U.S. Application Data

(63) Continuation-in-part of application No. PCT/JP02/03083, filed on Mar. 28, 2002.

(30) Foreign Application Priority Data

| Mar. 28, 2001 | (JP) | ............................ P2001-092651 |
| Jun. 19, 2001 | (JP) | ............................ P2001-184835 |
| Jun. 25, 2001 | (JP) | ............................ P2001-191573 |

(51) Int. Cl.
*B32B 27/32* (2006.01)

(52) U.S. Cl. ...................... 428/516; 428/500; 428/515; 428/518; 428/523; 525/78; 525/240

(58) Field of Classification Search ................ 428/500, 428/522

See application file for complete search history.

(56) References Cited

U.S. PATENT DOCUMENTS

| 4,134,927 | A | 1/1979 | Tomoshige et al. |
| 4,684,576 | A * | 8/1987 | Tabor et al. ................. 428/441 |
| 5,230,935 | A | 7/1993 | Delimoy et al. |
| 5,331,071 | A | 7/1994 | Kataoka et al. |
| 5,643,997 | A | 7/1997 | Matsuoka et al. |
| 5,902,655 | A * | 5/1999 | Matsuoka et al. ......... 428/35.2 |
| 6,162,871 | A | 12/2000 | Watanabe et al. |
| 6,214,426 | B1 * | 4/2001 | Kawachi et al. ........... 428/36.6 |
| 6,294,235 | B1 | 9/2001 | Detoumay et al. |
| 2003/0175538 | A1 | 9/2003 | Yamaguchi et al. |

FOREIGN PATENT DOCUMENTS

| EP | 0 479 457 A1 * | 9/1991 |
| EP | 0 834 415 A2 | 4/1998 |
| EP | 0 834 415 A3 | 1/1999 |
| JP | 50-7847 A | 1/1975 |
| JP | 52-49289 A | 4/1977 |
| JP | 54-83 A | 1/1979 |
| JP | 56-159239 A | 12/1981 |
| JP | 59068351 A | 4/1984 |
| JP | 59-224343 A | 12/1984 |
| JP | 4-238028 A | 8/1992 |
| JP | 5-132518 A | 5/1993 |
| JP | 7-300123 A | 11/1995 |
| JP | 9029867 A | 2/1997 |
| JP | 9-176391 A | 7/1997 |
| JP | 9-235319 A | 9/1997 |
| JP | 9-302160 A | 11/1997 |
| JP | 2000-211623 A | 8/2000 |
| JP | 2001055051 A | 2/2001 |
| JP | 3776381 B2 | 5/2006 |
| WO | WO 99/65957 A1 | 12/1999 |

\* cited by examiner

*Primary Examiner*—Monique R. Jackson
(74) *Attorney, Agent, or Firm*—Sughrue Mion, PLLC

(57) ABSTRACT

An object of the present invention is to provide an adhesive resin composition which displays excellent adhesive strength on bonding to a barrier material, during initial adhesion, durable adhesion, and even after soak in fuel oil, and which also has excellent moldability. Furthermore, another object of the present is to provide an adhesive resin composition which when recycled, displays good compatible in a regrind layer with polyethylene resins and barrier materials such as saponified products of ethylene-vinyl acetate copolymers or polyamide based resins, and which is consequently capable of suppressing deterioration in the low temperature impact resistance of a multi-layer vessel containing a regrind layer. In order to achieve these objects, the present invention provides an adhesive resin composition (C) comprising (A) 100 to 5% by mass of a modified polyethylene in which an unsaturated carboxylic acid and/or an unsaturated carboxylic acid derivative unit is grafted to a high molecular weight polyethylene with a melt flow rate (MFR: temperature 190° C., loading 2.16 kg) of 0.1 to 2.0 g/10 minutes, and a density of 0.91 to 0.96 g/cm³, and (B) 0 to 95% by mass of an unmodified polyethylene with a melt flow rate (MFR: temperature 190° C., loading 2.16 kg) of 0.1 to 20 g/10 minutes, and a density of 0.86 to 0.96 g/cm³, wherein the density of the adhesive resin composition (C) is 0.925 to 0.940 g/cm³, the content of the unsaturated carboxylic acid and/or unsaturated carboxylic acid derivative unit incorporated therein is at least 0.09% by mass, and the melt flow rate (MFR: temperature 190° C., loading 2.16 kg) is from 0.1 to 2 g/10 minutes.

32 Claims, 5 Drawing Sheets

ELUTION TEMPERATURE OF ETHYLENE COPOLYMER (A1) USED IN THE PRESENT INVENTION − ELUTION QUANTITY CURVE

ELUTION TEMPERATURE OF ETHYLENE COPOLYMER PRODUCED USING METALLOCENE BASED CATALYSTUSED IN THE PRESENT INVENTION − ELUTION QUANTITY CURVE

ADHESIVE RESIN COMPOSITION AND MULTI-LAYER LAMINATED STRUCTURE USING THE SAME

CROSS REFERENCE TO RELATED APPLICATION

This is a Continuation-In-Part of Application No. PCT/JP02/03083 with an international filing date of Mar. 28, 2002; the complete disclosure of which is incorporated herein by reference.

TECHNICAL FIELD

The present invention relates to an adhesive resin composition which displays excellent initial adhesion and durable adhesion to barrier materials such as saponified products of ethylene-vinyl acetate copolymers, or polyamide based resins, has excellent moldability, and for which deterioration in the physical properties during the recycling of molding by-products such as burrs and unused parison can be significantly suppressed. Furthermore, the present invention also relates to multi-layer laminated structures such as laminated vessels or laminated sheets using such an adhesive resin composition, which display good adhesive strength between layers, have good low temperature impact resistance, and display excellent resistance to fuel oil.

BACKGROUND ART

In recent years, multi-layer laminated structures such as multi-layer vessels and multi-layer sheets, which comprises saponified products of ethylene-vinyl acetate copolymers or polyamide based resins as a barrier layer, and a polyolefin as the outermost layer, are gradually being employed for applications which have conventionally used metals.

For example, in view of a lighter weight, a greater capacity, ease of molding, and rust resistance, in the case vehicle fuel vessels and drums, the change from metal tanks to synthetic resin tanks is occurring rapidly.

In particular, synthetic resin fuel vessels are required to have resistance to fuel oil, impact resistance and adhesion durability. For synthetic resin fuel vessels which satisfy these requirements, multi-layer laminated structures comprising a layer made of a barrier material such as a saponified product of an ethylene-vinyl acetate copolymer, or a polyamide resin, which provides an excellent barrier to penetration by gases or liquids, and a layer made of a high density polyethylene resin, which offers excellent mechanical characteristics, laminated together are now in widespread use.

In addition, in recent years the performance requirements for fuel vessels have been tightened even further. For example, long term maintenance of performance for the so-called "15 years, 150,000 miles" period is now required. Examples of the specifics of the performance requirements which must be maintained for this long period include no peeling of individual layers of the multi-layer laminated structure, no deterioration or layer abnormalities within the barrier layer in order to prevent volatilization of fuel components into the atmosphere, no fuel volatilization arising from peeling of the pinch off section produced by a die cutter during the blow molding process, and maintenance of the low temperature impact resistance above a certain level in order to minimize damage caused by a collision or the like.

However, barrier materials such as saponified products of ethylene-vinyl acetate copolymers or polyamide based resins and polyethylene resins display almost no natural adhesion, and consequently during lamination of these resins, an adhesive resin with good adhesion to both layers must be used.

Examples of this type of adhesive resin composition include resin compositions comprising a polyolefin based polymer modified with a solid rubber as disclosed in Japanese Unexamined Patent Application, First Publication No. Sho 50-7847 and resin compositions comprising an ethylene/α-olefin copolymer rubber modified with an unsaturated carboxylic acid as disclosed in Japanese Unexamined Patent Application, First Publication No. Sho 52-49289.

Furthermore, in order to improve thermal stability and prevent apparatus corrosion, these compositions typically also contain antioxidants and acid absorbers. Phenol based antioxidants or phosphorus based antioxidants are usually used to improve the thermal stability, and metal slats of fatty acids such as calcium stearate or the like is usually used to prevent apparatus corrosion.

However, although the above compositions provide a certain degree of adhesive strength, the adhesive strength is not entirely satisfactory for modern high speed molding or for thin film sections such as vessel pinch off sections generated during rapid deformations during molding. In addition, when soaked in fuel such as gasoline, which represents an actual potential application, there was a significant decrease in adhesive strength.

Furthermore, in those cases in which these types of adhesive resin compositions were used, if the burrs and unused parison and the like produced as by-products during the molding of a large vessel or sheet are returned to the process and used as a regrind layer, then because the compatible of these by-products with the major constituents, namely the polyethylene resin and the barrier materials such as the saponified product of an ethylene-vinyl acetate copolymer or the polyamide based resin, is unsatisfactory, the low temperature impact resistance of the multi-layer vessel itself may deteriorate.

An object of the present invention is to provide an adhesive resin composition which displays excellent adhesive strength on bonding to a barrier material, during initial adhesion, durable adhesion, and even after soak in fuel oil, and which also has excellent moldability. Furthermore, another object of the present invention is to provide an adhesive resin composition which when recycled, displays good compatible in a regrind layer with polyethylene resins and barrier materials such as saponified products of ethylene-vinyl acetate copolymers or polyamide based resins, and which is consequently capable of suppressing deterioration in the low temperature impact resistance of a multi-layer vessel comprising a regrind layer. In addition, yet another object of the present invention is to provide a multi-layer laminated structure with excellent low temperature impact resistance formed using such an adhesive resin composition.

DISCLOSURE OF INVENTION

As a result of intensive investigations aimed at improving the problems associated with conventional adhesive resin compositions, the inventors of the present invention discovered that the problems could be resolved by an adhesive resin composition described below and a multi-layer laminated structure using such an adhesive resin composition.

An adhesive resin composition of the present invention is an adhesive resin composition (C) comprising (A) 100 to 5% by mass of a modified polyethylene in which an unsaturated carboxylic acid and/or an unsaturated carboxylic acid derivative unit is grafted to a high molecular weight polyethylene with a melt flow rate (MFR: temperature 190° C., loading 2.16 kg) of 0.1 to 2.0 g/10 minutes, and a density of 0.91 to 0.96 g/cm$^3$, and (B) 0 to 95% by mass of an unmodified polyethylene with a melt flow rate (MFR: temperature 190° C., loading 2.16 kg) of 0.1 to 20 g/10 minutes, and a density of 0.86 to 0.96 g/cm$^3$, wherein the density of the adhesive resin composition (C) is 0.925 to 0.940 g/cm$^3$, the content of the unsaturated carboxylic acid and/or an unsaturated carboxylic acid derivative unit is 0.09% by mass or greater, and the melt flow rate (MFR: temperature 190° C., loading 2.16 kg) is 0.1 to 2 g/10 minutes.

Furthermore, the present invention also provides an adhesive resin composition, wherein the ratio MFR(A)/MFR(B), where MFR(A) represents the melt flow rate (MFR: temperature 190° C., loading 2.16 kg) of the modified polyethylene (A) and MFR(B) represents the melt flow rate (MFR: temperature 190° C., loading 2.16 kg) of the unmodified polyethylene (B), is less than 1.

Furthermore, the present invention also provides an adhesive resin composition, wherein the adhesive resin composition (C) comprises (a) 100 to 5% by mass of a modified polyethylene with a melt flow rate of 0.1 to 2.0 g/10 minutes, and a density of 0.93 to 0.96 g/cm$^3$, (b) 0 to 95% by mass of an unmodified polyethylene with a melt flow rate of 0.1 to 20 g/10 minutes, and a density of 0.93 to 0.96 g/cm$^3$, (c) no more than 70% by mass of a modified and/or unmodified linear low density polyethylene with a melt flow rate of 0.1 to 20 g/10 minutes, and a density of 0.91 to 0.94 g/cm$^3$, and/or (d) no more than 50% by mass of a modified and/or unmodified ultra low density polyethylene with a melt flow rate of 0.1 to 20 g/10 minutes, and a density of 0.86 to 0.91 g/cm$^3$, and (a)+(b)+(c)+(d) totals 100% by mass.

Furthermore, the present invention also provides an adhesive resin composition, wherein the modified polyethylene (a) is a high density polyethylene with a melt flow rate of 0.1 to 2.0 g/10 minutes and a density of 0.93 to 0.96 g/cm$^3$, and the unmodified polyethylene (b) is a high density polyethylene with a melt flow rate of 0.1 to 20 g/10 minutes and a density of 0.93 to 0.96 g/cm$^3$.

Furthermore, the present invention also provides an adhesive resin composition, wherein the linear low density polyethylene (c) and/or the ultra low density polyethylene (d) are resin compositions comprising an ethylene/α-olefin copolymer (A) (hereafter referred to as an ethylene copolymer) which satisfy the conditions (1) to (4) shown below:

(1) a density of 0.86 to 0.94 g/cm$^3$, (2) a melt flow rate of 0.1 to 20 g/10 minutes, (3) a molecular weight distribution (Mw/Mn) of 1.5 to 4.5, and (4) a difference between $T_{25}$, representing the temperature at which 25% of the total is eluted, determined from the integrated elution curve of an elution temperature vs. elution quantity curve obtained by a temperature rising elution fractionation (TREF) method, and $T_{75}$, representing the temperature at which 75% of the total is eluted, namely $T_{75}-T_{25}$, and a density d which satisfy the relationship of an equation 1, shown below.

$$T_{75}-T_{25} \leq -670 \times d + 644 \qquad \text{(equation 1)}$$

Furthermore, the present invention also provides an adhesive resin composition, wherein the ethylene copolymer (A) also satisfies the relationship (5) described below:

(5) a difference between $T_{25}$, representing the temperature at which 25% of the total is eluted, determined from the integrated elution curve of an elution temperature vs. elution quantity curve obtained by a temperature rising elution fractionation (TREF) method, and $T_{75}$, representing the temperature at which 75% of the total is eluted, namely $T_{75}-T_{25}$, and a density d which satisfy the relationship of an equation 2, $T_{75}-T_{25} \geq 300 \times d + 285$.

Furthermore, the present invention also provides an adhesive resin composition, wherein the ethylene copolymer (A) is an ethylene copolymer (A1) which satisfies the conditions (6) and (7) described below:

(6) a quantity X (% by mass) of an orthodichlorobenzene (ODCB) soluble fraction at 25° C., a density d, and a melt flow rate (MFR) which satisfy the relationships of an equation 3 and an equation 4 shown below:

$$X<2.0 \text{ in cases in which } d-0.008 logMFR \geq 0.93 \qquad \text{(equation 3)}$$

$$X<9.8 \times 10^3 \times (0.9300-d+0.008 logMFR)^2 + 2.0 \text{ in cases in which } d-0.008 logMFR<0.93, \qquad \text{(equation 4)}$$

, and (7) an elution temperature vs. elution quantity curve obtained by a temperature rising elution fractionation (TREF) method which has a plurality of peaks.

Furthermore, the present invention also provides an adhesive resin composition, wherein the ethylene copolymer (A) is an ethylene copolymer (A2) which satisfies the conditions (8) and (9) described below:

(8) an elution temperature vs. elution quantity curve obtained by a temperature rising elution fractionation (TREF) method which has only one peak, and (9) one, or two or more melting point peaks, wherein the highest melting point Tml and the density d satisfy the relationship of an equation 5, $Tml \geq 150 \times d - 19$.

Furthermore, the present invention also provides an adhesive resin composition, wherein the ethylene copolymer (A2) also satisfies the condition (10) described below:

(10) a melt tension (MT) and a melt flow rate (MFR) which satisfy an equation 6 shown below.

$$logMT \leq 0.572 \times logMFR + 0.3 \qquad \text{(equation 6)}$$

Furthermore, the present invention also provides an adhesive resin composition, wherein the halogen concentration of the ethylene copolymer (A) is no more than 10 ppm.

Furthermore, the present invention also provides an adhesive resin composition, wherein the resin composition incorporating the ethylene copolymer (A) comprises substantially no additives.

Furthermore, the present invention also provides an adhesive resin composition, wherein if aliphatic metal salts exist within the adhesive resin composition, the concentration thereof is less than 100 weight ppm.

Furthermore, the present invention also provides an adhesive resin composition, wherein the unsaturated carboxylic acid is an acid anhydride.

Furthermore, the present invention also provides an adhesive resin composition, wherein the ring opening ratio of acid anhydride groups following modification is maintained at no more than 10%.

Furthermore, the present invention also provides an adhesive resin composition, wherein the acid anhydride is maleic anhydride.

Furthermore, the present invention also provides an adhesive resin composition, wherein 6.7% by mass of an adhesive resin composition, 88.3% by mass of a high density polyethylene with a density of 0.945 g/cm$^3$ and a high load melt flow rate (temperature 190° C., load 21.6 kg) of 6 g/10 minutes, and 5% by mass of a saponified product of an ethylene-vinyl acetate copolymer are subjected to molten kneading, and subsequent press molding of the kneaded product, at a temperature setting of 200° C. and a press pressure of 6 MPa, is used to prepare a sheet of thickness 4 mm, and when the WV notch tensile impact strength of a test specimen of a shape 1 according to JIS K7160 prepared from this sheet is measured at −40° C., the WV notch tensile impact strength is at least 120 KJ/cm$^2$.

Furthermore, the present invention also provides an adhesive resin composition, wherein the molten kneading utilizes a 50 mm single screw kneader in which the C1-C2-C3-head-dice temperature settings are set to 180° C.-200° C.-200° C.-200° C.-200° C. respectively, and the screw revolutions are set to 60 rpm.

Furthermore, the present invention also provides a multi-layer laminated structure comprising an adhesive layer formed from the adhesive resin composition, and at least a principal material layer formed on the outside of the adhesive layer, and a barrier layer formed on the inside of the adhesive layer.

Furthermore, the present invention also provides a multi-layer laminated structure, wherein the principal material layer is a high density polyethylene layer and/or a regrind layer using recycled material.

Furthermore, the present invention also provides a multi-layer laminated structure of a 3 type 5 layer structure comprising a principal material layer formed from a high density polyethylene layer and/or the regrind layer/the adhesive resin composition layer/the barrier layer/the adhesive resin composition layer/and the principal material layer formed from a high density polyethylene layer and/or the regrind layer.

Furthermore, the present invention also provides a multi-layer laminated structure, wherein the principal material layer is a high density polyethylene with a density of 0.93 to 0.97 g/cm$^3$ and a melt flow rate of 0.01 to 50 g/10 minutes.

Furthermore, the present invention also provides a multi-layer laminated structure, wherein the barrier layer is at least one material selected from a group consisting of saponified products of ethylene-vinyl acetate copolymers, polyamide based resins, polyester based resins and vinylidene chloride based resins.

Furthermore, the present invention also provides a multi-layer laminated structure, wherein the adhesion interface between the adhesive resin composition layer and/or the regrind layer, and the barrier layer is formed as an irregular surface.

Furthermore, the present invention also provides a multi-layer laminated structure, wherein viewing the interface structure of the multi-layer laminated structure with a transmission electron microscope at a magnification within a range from 20,000×to 50,000×reveals irregularities with an elevation difference of at least 100 nm.

Furthermore, the present invention also provides a multi-layer laminated structure, wherein the barrier layer is formed from a saponified product of an ethylene-vinyl acetate copolymer.

Furthermore, the present invention also provides a vessel formed from the multi-layer laminated structure.

Furthermore, the present invention also provides a vessel which is a blow vessel selected from a group consisting of a fuel tank, a food vessel, and an industrial chemical vessel.

BEST MODE FOR CARRYING OUT THE INVENTION

Figure 1:
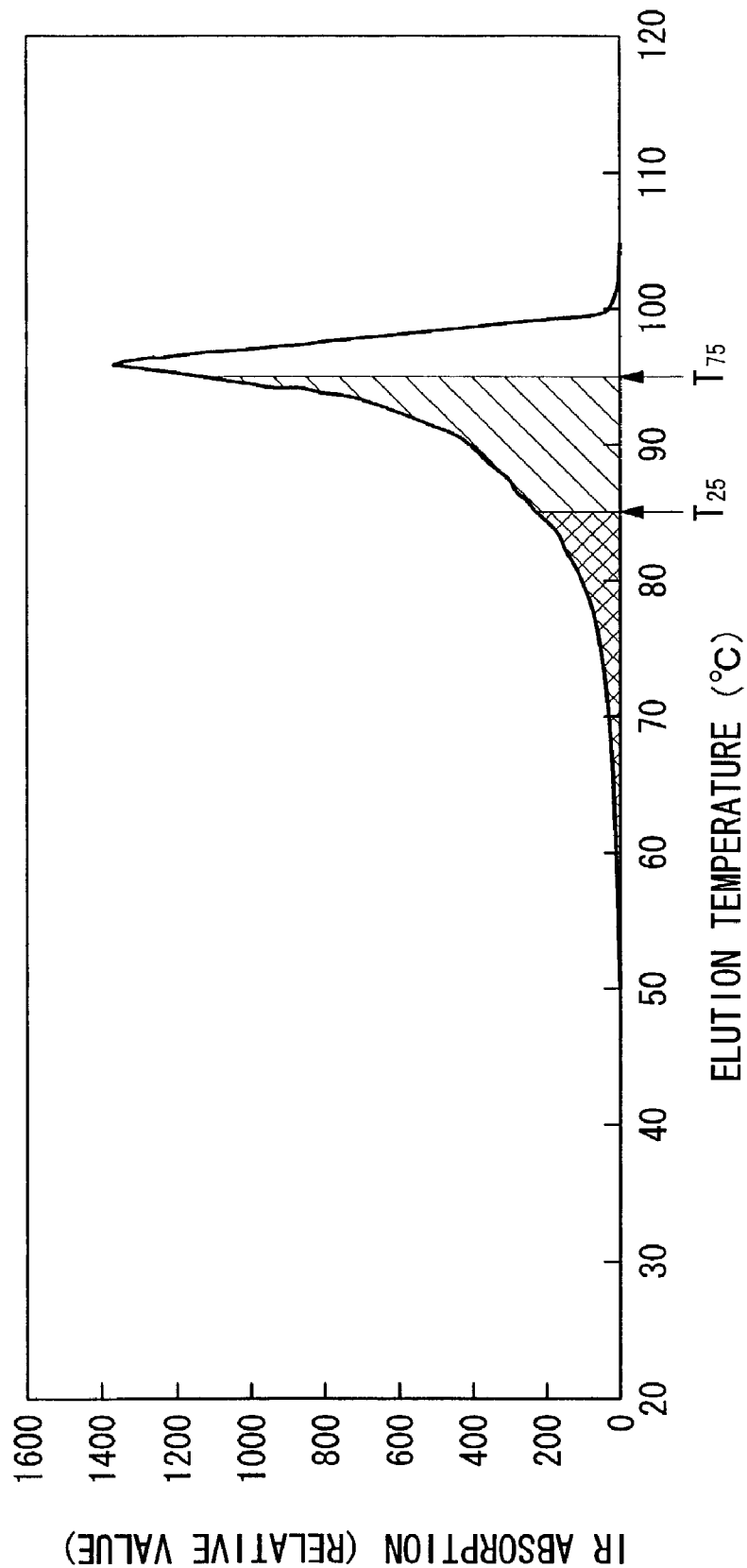
FIG. 1 is a graph showing an elution temperature vs. elution quantity curve for an ethylene copolymer (A) used in the present invention.

As follows is a more detailed description of the present invention.

[Modified Polyethylene (A)]

A modified polyethylene (A) of the present invention is a polyethylene to which an unsaturated carboxylic acid and/or an unsaturated carboxylic acid derivative unit has been grafted, and has a density from 0.91 to 0.96 g/cm$^3$, and preferably from 0.915 to 0.96 g/cm$^3$, and even more preferably from 0.93 to 0.96 g/cm$^3$.

It is extremely important that the polyethylene is a high molecular weight polyethylene with a melt flow rate (MFR: temperature 190° C., loading 2.16 kg) of 0.1 to 2.0 g/10 minutes, and preferably from 0.1 to 1.5 g/10 minutes, and the unsaturated carboxylic acid and/or an unsaturated carboxylic acid derivative unit is then grafted to this high molecular weight polyethylene.

Examples of suitable raw material polyethylenes include homopolymers formed solely from ethylene, and copolymers formed from ethylene and an α-olefin of 3 to 12 carbon atoms.

Examples of this type of α-olefin include propylene, 1-butene, 1-hexene, 4-methyl-1-pentene and 1-octene. Specific examples of the polyethylene include high density polyethylenes and linear low density polyethylenes, although high density polyethylenes with a density of 0.93 to 0.96 g/cm$^3$ are preferred.

These polymers can be produced using a typical Ziegler system catalyst or a chromium based catalyst, or may also be produced using a so-called single site catalyst.

In the present invention, by modifying the type of high molecular weight polyethylene, an adhesive resin composition can be obtained which displays excellent adhesive strength during initial adhesion, durable adhesion, and even after soak in a fuel (fuel oil resistance).

Furthermore, an adhesive resin composition can be obtained which when recycled, displays good compatible in a regrind layer with polyethylene resins and barrier materials such as saponified products of ethylene-vinyl acetate copolymers or polyamide based resins, and which is consequently capable of suppressing deterioration in the low temperature impact resistance of a multi-layer vessel containing a regrind layer. If the MFR of the polyethylene is less than 0.1 g/10 minutes or exceeds 2.0 g/10 minutes, then the interlayer adhesion, the moldability, the impact strength and the fuel oil resistance of the final multi-layer laminated structure deteriorate, and the object of the present invention cannot be achieved.

Furthermore, if the density of the polyethylene is less than 0.91 g/cm$^3$, then not only is the adhesive strength of the final multi-layer laminated structure unsatisfactory, but the resistance to fuel oil and the like (resistance to swelling) is also insufficient. In contrast, if the density of the polyethylene exceeds 0.96 g/cm$^3$, then the impact resistance and the interlayer adhesion of the final multi-layer laminated structure are unsatisfactory.

When this type of polyethylene undergoes graft modification, preferably 0.1 to 2.0 parts by weight, and even more preferably 0.1 to 1.5 parts by weight, and most preferably 0.1 to 1.0 parts by weight of an unsaturated carboxylic acid and/or an unsaturated carboxylic acid derivative, and a radical initiator are added to 100 parts by weight of the polyethylene.

If the content of the unsaturated carboxylic acid and/or unsaturated carboxylic acid derivative added is less than 0.1 parts by weight, then the graft modification is insufficient, and the adhesiveness of the product adhesive resin composition may be unsatisfactory. In contrast, if the content exceeds 2.0 parts by weight, then not only is there a risk of the product modified polyethylene (A) gelling, deteriorating or coloring, but the adhesive strength and the mechanical strength of the final multi-layer laminated structure may also deteriorate.

Furthermore, the content of radical initiator added should preferably be from 0.001 to 0.5 parts by weight, and more preferably from 0.005 to 0.3 parts by weight, and even more preferably from 0.010 to 0.3 parts by weight. If the proportion of the radical initiator is less than 0.001 parts by weight, then a considerable length of time is required to achieve complete graft modification. Furthermore, the graft modification of the polyethylene may be insufficient, leading to unsatisfactory adhesive strength. In contrast, if the content exceeds 0.5 parts by weight, then the radical initiator may cause excessive decomposition or cross linking reactions.

Examples of the unsaturated carboxylic acid and/or unsaturated carboxylic acid derivative used in the modification include monobasic unsaturated carboxylic acids and dibasic unsaturated carboxylic acids, as well as metal salts, amides, imides, esters and acid anhydrides thereof.

The number of carbon atoms of such monobasic unsaturated carboxylic acids and monobasic unsaturated carboxylic acid derivatives should be no more than 20, and preferably no more than 15. Furthermore, the number of carbon atoms of such dibasic unsaturated carboxylic acids and dibasic unsaturated carboxylic acid derivatives should be no more than 30, and preferably no more than 25.

Specific examples of these unsaturated carboxylic acids and unsaturated carboxylic acid derivatives include acrylic acid, methacrylic acid, glycidyl methacrylate, maleic acid and the anhydride thereof, and 5-norbornene-2,3-dicarboxylic acid and the anhydride thereof.

Of these compounds, acid anhydrides are particularly preferred. Specific examples of such anhydrides include maleic anhydride, 5-norbornene acid anhydride, chlorendic anhydride, pyromellitic anhydride and phthalic anhydride, and of these maleic anhydride is particularly preferred. Adhesive resin compositions obtained using these types of acid anhydrides display extremely good adhesive performance.

Examples of the radical initiator include organic peroxides such as dicumyl peroxide, benzoyl peroxide, di-t-butyl peroxide, 2,5-dimethyl-2,5-di(t-butylperoxy)hexane, 2,5-dimethyl-2,5-di(t-butylperoxy)hexyne, 2,5-dimethyl-2,5-di(t-butylperoxy)hexane-3, lauroyl peroxide, t-butylperoxy benzoate, and dicumyl peroxide.

Examples of suitable graft modification methods include molten kneading methods in which a polyethylene such as the high density polyethylene resin (a), an unsaturated carboxylic acid and/or an unsaturated carboxylic acid derivative, and a radical initiator are kneaded together in a molten state using a kneading device such as an extruder, a Banbury mixer or a kneader; solution methods in which a polyethylene, an unsaturated carboxylic acid and/or an unsaturated carboxylic acid derivative, and a radical initiator are dissolved in a suitable solvent; and slurry methods in which an unsaturated carboxylic acid and/or an unsaturated carboxylic acid derivative, and a radical initiator act upon particles of a high density polyethylene (a) suspended in a slurry. In addition, in order to improve the physical properties of the modified polyethylene (A), the product may be heated or washed following the graft modification, so as to remove any unreacted unsaturated carboxylic acid and/or unsaturated carboxylic acid derivative monomers as well as any by-products. The actual method employed can be selected in accordance with the intended use of the final product multi-layer laminated structure.

The temperature during modification is determined taking into consideration factors such as deterioration of the polyethylene, decomposition of the unsaturated carboxylic acid and/or the unsaturated carboxylic acid derivative, and the decomposition temperature of the radical initiator used.

For example, in the molten kneading method, the temperature is typically from 200 to 350° C., and preferably from 220 to 300° C., and even more preferably from 250 to 300° C.

In the present invention, during the modification, other resins may also be incorporated provided such addition does not result in a deviation from the intent of the invention.

Examples of other synthetic resins include high pressure low density polyethylene resins, and copolymers of ethylene and other vinyl monomers, such as ethylene-vinyl acetate copolymers, ethylene-acrylic acid copolymers, ethylene-methacrylic acid copolymers, ethylene-methylacrylate copolymers, ethylene-ethylacrylate copolymers, ethylene-butylacrylate copolymers, and ethylene-methylmethacrylate copolymers.

Examples of other elastomers include ethylene-α-olefin type copolymer rubbers such as ethylene-propylene copolymer rubber, ethylene-propylene-diene three component copolymer rubber, and ethylene-butene-1 copolymer rubber; synthetic rubbers such as polyisobutylene rubber, polyurethane rubber, styrene-butadiene copolymer rubber and polybutadiene rubber; as well as natural rubber.

These other synthetic resins and elastomers (rubbers) can be used in proportions of no more than 10% by mass, and preferably no more than 5% by mass, relative to the combined total weight of the high density polyethylene resin for modification (a), and the linear low density polyethylene (c)

which is the raw material for a modified linear low density polyethylene described below. If the content of other synthetic resins and elastomers (rubbers) used exceeds 10% by mass, then there is a risk of a deterioration in the basic characteristics of the high density polyethylene resin (a) or the linear low density polyethylene (c).

[Unmodified Polyethylene (B)]

The unmodified polyethylene (B) is used to dilute the modified polyethylene (A) described above. Examples of this unmodified polyethylene (B) include homopolymers formed solely from ethylene, and copolymers formed from ethylene and an α-olefin of 3 to 12 carbon atoms. Examples of the α-olefin include propylene, 1-butene, 1-hexene, 4-methyl-1-pentene and 1-octene. Specific examples of the polyethylene include high density polyethylenes, linear low density polyethylenes, and ultra low density polyethylenes, although high density polyethylenes with a density of 0.93 to 0.96 g/cm are preferred.

These polymers can be produced using a typical Ziegler system catalyst or a chromium based catalyst, or may also be produced using a so-called single site catalyst.

Furthermore, the unmodified polyethylene (B) has a MFR at a temperature of 190° C. and a loading of 2.16 kg of 0.1 to 20 g/10 minutes, and a density within a range from 0.86 to 0.96 g/cm$^3$, and preferably from 0.91 to 0.96 g/cm$^3$, and even more preferably from 0.93 to 0.96 g/cm$^3$. If the MFR is less than 0.1 g/10 minutes, then the compatible with the modified polyethylene (A) and the other resins deteriorates, whereas if the MFR exceeds 20 g/10 minutes, then there is a risk of a deterioration in the adhesive strength and the moldability. Furthermore, if the density is less than 0.86 g/cm$^3$, then not only is there a risk that the adhesive strength of the final multi-layer laminated structure will be unsatisfactory, but the resistance to fuel oil and the like is also insufficient, whereas if the density exceeds 0.96 g/cm$^3$, then a there is a risk of a deterioration in the adhesiveness of the final adhesive resin composition.

An adhesive resin composition (C) of the present invention should preferably also comprise up to 70% by mass of a linear low density polyethylene (c) with a density of 0.91 to 0.94 g/cm$^3$ and a melt flow rate of 0.1 to 20 g/10 minutes, and/or up to 50% by mass of an ultra low density polyethylene (d) with a density of 0.86 to 0.91 g/cm$^3$ and a melt flow rate of 0.1 to 20 g/10 minutes. The linear low density polyethylene (c) and/or the ultra low density polyethylene (d) may be either modified or unmodified materials.

[Linear Low Density Polyethylene (c)]

A linear low density polyethylene (c) according to the present invention can utilize any polyethylene, provided the density is from 0.91 to 0.94 g/cm$^3$ and the melt flow rate is from 0.1 to 20 g/10 minutes. Specific examples include copolymers formed from ethylene and an α-olefin of 3 to 12 carbon atoms. Examples of the α-olefin include propylene, 1-butene, 1-hexene, 4-methyl-1-pentene and 1-octene.

The density of the linear low density polyethylene (c) should be within a range from 0.91 to 0.94 g/cm$^3$, and preferably from 0.915 to 0.935 g/cm$^3$, and even more preferably from 0.92 to 0.93 g/cm$^3$. If the density is less than from 0.91 g/cm$^3$ or greater than 0.940 g/cm$^3$, then there is a risk the degree of improvement in the adhesive strength and the low temperature impact strength of the product adhesive resin composition will be unsatisfactory.

Furthermore, the MFR of the linear low density polyethylene (c) should be within a range from 0.1 to 20 g/10 minutes, and preferably from 0.1 to 15 g/10 minutes, and even more preferably from 0.1 to 10 g/10 minutes. If the MFR is less than 0.1 g/10 minutes, then the compatible during blending deteriorates, whereas if the MFR exceeds 20 g/10 minutes, then there is a risk of a deterioration in the moldability, the adhesive strength and the mechanical strength and the like.

The linear low density polyethylene (c) should preferably comprise from 5 to 30, and even more preferably from 5 to 25 short chain branches for every 1,000 carbon atoms of the principal chain. If the number of short chain branches falls outside the above range, then problems can arise with the adhesiveness and the impact resistance.

Here, a short chain refers essentially to an alkyl chain of 1 to 10 carbon atoms, and preferably 1 to 6 carbon atoms.

The melting point of the linear low density polyethylene (c) as determined by a differential scanning calorimetry method (a DSC method) should preferably be from 115 to 130° C. At melting points less than 115° C. the adhesiveness is unsatisfactory, whereas if the melting point exceeds 130° C., the impact resistance is unfavorable.

Here, melting points according to a DSC method are measured by forming a sheet of thickness 0.2 mm using a hot press method, punching out an approximately 5 mg sample from the sheet, and then holding the sample at a temperature of 200° C. for 5 minutes, cooling the temperature to 30° C. at a rate of 10° C. per minute, and then raising the temperature to 200° C. again at a rate of 10° C. per minute, with the melting point (Tml) then being defined as the temperature at the apex of the highest temperature peak.

[Ultra Low Density Polyethylene (d)]

An ultra low density polyethylene (d) used in the present invention is an ethylene-α-olefin copolymer with a density of 0.86 to 0.91 g/cm$^3$ and a MFR of 0.1 to 20 g/10 minutes. Specific examples include copolymers formed from ethylene and an α-olefin of 3 to 12 carbon atoms. Examples of the α-olefin include propylene, 1-butene, 1-hexene, 4-methyl-1-pentene and 1-octene.

The density of the ultra low density polyethylene (d) should be within a range from 0.86 to 0.91 g/cm$^3$, and preferably from 0.89 to 0.91 g/cm$^3$, and even more preferably from 0.90 to 0.91 g/cm$^3$. If the density is less than from 0.86 g/cm$^3$, then there is a possibility of problems remaining with respect to fuel oil resistance of the product adhesive resin composition, whereas in contrast, if the density exceeds 0.91 g/cm$^3$, then there is a possibility that the degree of improvement in the low temperature impact resistance and the like will be unsatisfactory.

Furthermore, the MFR of the ultra low density polyethylene (d) should be within a range from 0.1 to 20 g/10 minutes, and preferably from 0.1 to 15 g/10 minutes, and even more preferably from 0.1 to 10 g/10 minutes.

If the MFR is less than 0.1 g/10 minutes, then the compatible during blending deteriorates, whereas if the MFR exceeds 20 g/10 minutes, then there is a risk that the degree of improvement in the moldability, the adhesive strength and the mechanical strength and the like will be insufficient.

The melting point of the ultra low density polyethylene (d) as determined by a differential scanning calorimetry method (a DSC method) should preferably be from 90 to 125° C. At melting points less than 90° C. the heat resistance of the product adhesive resin composition is unsatisfactory, whereas if the melting point exceeds 125° C., the impact resistance and the adhesiveness are unfavorable.

The linear low density polyethylene (c) and the ultra low density polyethylene (d) can be distinguished on the basis of density range. There are no particular restrictions on the method of producing the linear low density polyethylene (c) and the ultra low density polyethylene (d), and suitable methods include copolymerization of ethylene and the α-olefin via a gas phase method, a solution method or a slurry (suspension) method, using either a so-called Ziegler catalyst, a chromium based catalyst, a single site catalyst or a metallocene based catalyst, although a specific ethylene-α-olefin copolymer (A) (hereafter referred to as an ethylene copolymer (A)) which satisfies the conditions (1) to (4) listed below is preferred:

(1) a density of 0.86 to 0.94 g/cm³,
(2) a melt flow rate of 0.1 to 20 g/10 minutes,
(3) a molecular weight distribution (Mw/Mn) of 1.5 to 4.5, and
(4) a difference between $T_{25}$, representing the temperature at which 25% of the total is eluted, determined from the integrated elution curve of an elution temperature vs. elution quantity curve obtained by a temperature rising elution fractionation (TREF) method, and $T_{75}$, representing the temperature at which 75% of the total is eluted, namely $T_{75}-T_{25}$, and a density d which satisfy the relationship of an equation 1, shown below.

$$T_{75}-T_{25} \leq -670 \times d + 644 \quad \text{(equation 1)}$$

An ethylene copolymer (A) used in the present invention is an ethylene-α-olefin copolymer obtained by copolymerization of ethylene and an α-olefin of 3 to 20 carbon atoms, and preferably 3 to 12 carbon atoms.

Specific examples of the α-olefin of 3 to 20 carbon atoms include propylene, 1-pentene, 4-methyl-1-pentene, 1-hexene, 1-octene, 1-decene and 1-dodecene. Furthermore, the content of these α-olefins should typically total no more than 30% by mol, and should preferably be selected from within a range from 3 to 20% by mol.

An ethylene copolymer (A) according to the present invention includes the linear low density polyethylenes (c) and the ultra low density polyethylenes (d), and (1) has a density within a range from 0.86 to 0.94 g/cm³, and preferably from 0.89 to 0.935 g/cm³, and even more preferably from 0.90 to 0.93 g/cm³. If the density is less than 0.86 g/cm³, then the adhesive strength (the break strength), the heat resistance and the fuel oil resistance deteriorate. In contrast, if the density exceeds 0.94 g/cm³, then there is a risk of the low temperature impact resistance and the like being unsatisfactory.

The melt flow rate (hereafter abbreviated as MFR) of the condition (2) in the present invention is within a range from 0.1 to 20 g/110 minutes, and preferably from 0.1 to 15 g/10 minutes, and even more preferably from 0.1 to 10 g/10 minutes. If the MFR is less than 0.1 g/10 minutes, then the molding workability deteriorates, whereas if the MFR exceeds 20 g/10 minutes, then there is a risk of a deterioration in the impact resistance and the fuel oil resistance and the like.

The molecular weight distribution (Mw/Mn) of the condition (3) in the present invention is within a range from 1.5 to 4.5, and preferably from 2.0 to 4.0, and even more preferably from 2.5 to 3.0. At Mw/Mn values of less than 1.5 the molding workability deteriorates, whereas if Mw/Mn exceeds 4.5, then there is a risk of a deterioration in the adhesive strength and the low temperature impact resistance.

Here, the molecular weight distribution (Mw/Mn) of an ethylene copolymer can be determined by calculating the ratio (Mw/Mn) between the weight average molecular weight (Mw) and the number average molecular weight (Mn) as determined by gel permeation chromatography (GPC).

An ethylene copolymer (A) according to the present invention should preferably satisfy the condition (4), as shown in FIG. 1, that the difference between $T_{25}$, representing the temperature at which 25% of the total is eluted, determined from the integrated elution curve of an elution temperature vs. elution quantity curve obtained by a temperature rising elution fractionation (TREF) method, and $T_{75}$, representing the temperature at which 75% of the total is eluted, namely $T_{75}-T_{25}$, and the density d satisfy the relationship $$T_{75}-T_{25} \leq -670 \times d + 644 \quad \text{(equation 1)}$$

In those cases in which $T_{75}-T_{25}$ and the density d do not satisfy the equation 1, there is a risk of a deterioration in the adhesive strength and the low temperature impact strength.

The TREF measurement method is performed in the manner described below. First, the sample is added to ODCB containing an antioxidant (such as butylhydroxytoluene) so that the sample concentration is 0.05% by mass, and the mixture is then heated to 140° C. and the sample dissolved. 5 ml of this sample solution is then injected into a column filled with glass beads, and is cooled to 25° C. at a cooling rate of 0.1° C./minute, so that the sample is deposited on the surface of the glass beads. Next, ODCB is passed through the column at a constant flow rate, while the column temperature is raised at a constant rate of 50° C./hour, and the sample is gradually eluted. During this process, the concentration of the sample eluted within the solvent is continuously detected by using an infrared detector to measure the absorption at wave number 2925 cm$^{-1}$ by the asymmetric stretching vibration of methylene. The concentration of ethylene copolymer within the solvent can be determined from this value by quantitative analysis, and the relationship between elution temperature and elution rate can then be determined. According to TREF analysis, the variation in elution rate relative to variations in temperature can be analyzed continuously using an extremely small content of a sample, and consequently it becomes possible to detect comparatively minor peaks which are not detectable by fractionation methods.

An ethylene copolymer (A) according to the present invention should preferably also satisfy a condition (5) that the difference between $T_{25}$, representing the temperature at which 25% of the total is eluted, determined from the integrated elution curve of an elution temperature vs. elution quantity curve obtained by a temperature rising elution fractionation (TREF) method, and $T_{75}$, representing the temperature at which 75% of the total is eluted, namely $T_{75}-T_{25}$, and the density d satisfy the relationship of an equation 2, $T_{75}-T_{25} \geq -300 \times d + 285$. If the values of $T_{75}-T_{25}$ and the density d satisfy the equation 2, then the performance of factors such as the heat resistance can be improved.

An ethylene copolymer (A) according to the present invention is preferably either an ethylene copolymer (A1) which in addition, also satisfies the conditions (6) and (7) listed below, or an ethylene copolymer (A2) which in addition, also satisfies the conditions (8) and (9) listed below.

(6) The quantity X (% by mass) of the ODCB soluble fraction at 25° C., the density d, and the melt flow rate (MFR) of an ethylene copolymer (A1) according to the present invention satisfy the relationships of equation 3 and equation 4 shown below, $$X<2.0 \text{ in cases in which } d-0.008 \log MFR \geq 0.93 \quad \text{(equation 3)}$$

$$X<9.8\times10^3\times(0.9300-d+0.008\log MFR)^2+2.0 \text{ in cases in which } d-0.008\log MFR<0.93 \quad \text{(equation 4)}$$

and preferably satisfy the relationships:

$X<1.0$ in cases in which $d-0.008 \log MFR \geq 0.93$, and $X<7.4\times10^3\times(0.9300-d+0.008 \log MFR)^2+2.0$ in cases in which $d-0.008 \log MFR<0.93$, and even more preferably satisfy the relationships:

$X<0.5$ in cases in which $d-0.008 \log MFR \geq 0.93$, and $X<5.6\times10^3\times(0.9300-d+0.008 \log MFR)^2+2.0$ in cases in which $d-0.008 \log MFR<0.93$ Here, the quantity X (% by mass) of the ODCB soluble fraction at 25° C. is measured by the method described below. 0.5 g sample in 20 ml of ODCB is heated at 135° C. for 2 hours, and following complete dissolution of the sample, the solution is cooled to 25° C. The solution is then left to stand overnight at 25° C., and is then filtered through a Teflon filter and the filtrate collected. Using this filtrate, which represents a solution of the sample, the absorption peak strength of the asymmetric stretching vibration of methylene at a wave number of approximately 2925 cm$^{-1}$ is measured with an infrared spectrometer, and the sample concentration is then calculated from a previously prepared calibration curve. This value determines the content of the ODCB soluble fraction at 25° C.

The ODCB soluble fraction at 25° C. represents the highly branched constituents and the low molecular weight constituents incorporated within the ethylene copolymer, which are responsible for a reduction in heat resistance and a stickiness on the surface of a molded product, and are also the cause of hygiene problems and blocking on the internal surface of a molded product, and consequently smaller ODCB soluble fractions are preferred. The content of the ODCB soluble fraction is affected by the content and the molecular weight of the α-olefin within the copolymer, in other words, the density and the MFR. Accordingly, if these indicators, namely the density, the MFR and the content of the ODCB soluble fraction, satisfy the above equation, then this indicates that uneven distribution of the α-olefin within the copolymer is limited.

Furthermore, an ethylene copolymer (A1) according to the present invention is a copolymer for which (7) the elution temperature vs. elution quantity curve obtained by a temperature rising elution fractionation (TREF) method has a plurality of peaks. Copolymers in which the peak temperature of the highest temperature peak amongst the plurality of peaks is within a range from 85° C. to 100° C. are particularly preferred. The existence of this peak raises the melting point, increases the degree of crystallization and improves the heat resistance and the rigidity of a molded product.

Furthermore, an ethylene copolymer (A2) according to the present invention is a copolymer which (8) has one, or two or more melting point peaks, and moreover of these peaks, (9) the highest melting point Tm1 and the density d satisfy the relationship of an equation 5 shown below.

$$Tm1 \geq 150 \times d - 19 \quad \text{(equation 5)}$$

If the melting point Tm1 and the density d satisfy the relationship of the equation 5 above, then the heat resistance improves.

Furthermore, amongst ethylene copolymers (A2), ethylene copolymers which also satisfy the condition (10) shown below are preferred.

(10) a melt tension (MT) and a melt flow rate (MFR) which satisfy the relationship of an equation 6 shown below:

$$\log MT \leq -0.572 \times \log MFR + 0.3 \quad \text{(equation 6)}$$

If the MT and the MFR values satisfy the relationship of the equation 6 above, then the molding workability in extrusion molding or the like is very favorable.

Figure 2:
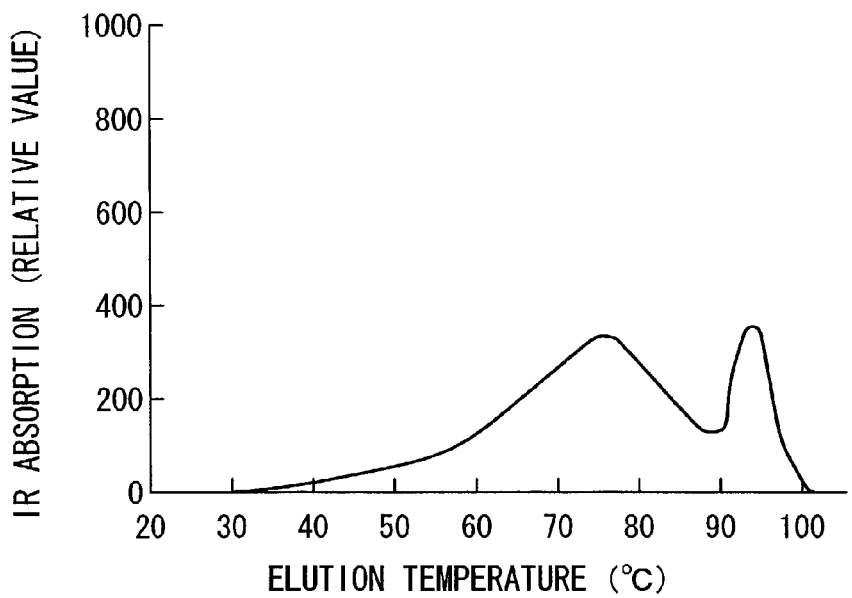
FIG. 2 is a graph showing an elution temperature vs. elution quantity curve for an ethylene copolymer (A1) used in the present invention.
Figure 3:
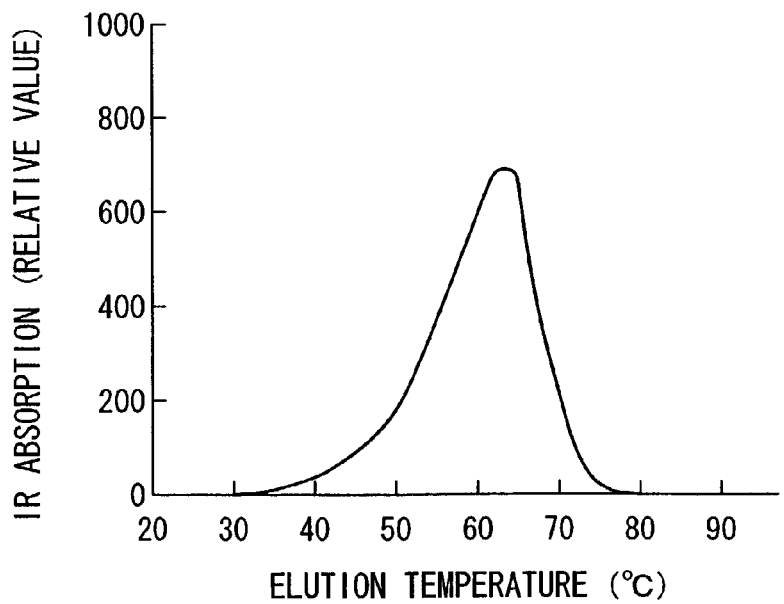
FIG. 3 is a graph showing an elution temperature vs. elution quantity curve for an ethylene copolymer (A3) produced using a typical metallocene based catalyst.

Here, an ethylene copolymer (A1) is a special ethylene-α-olefin copolymer for which, as is shown in FIG. 2, the elution temperature vs. elution quantity curve obtained by a temperature rising elution fractionation (TREF) method has a plurality of peaks. In contrast, an ethylene copolymer of FIG. 3 is an ethylene copolymer for which the elution temperature vs. elution quantity curve obtained by a temperature rising elution fractionation (TREF) method has essentially a single peak, and corresponds with a conventional ethylene copolymer produced using a typical metallocene based catalyst.

Figure 4:
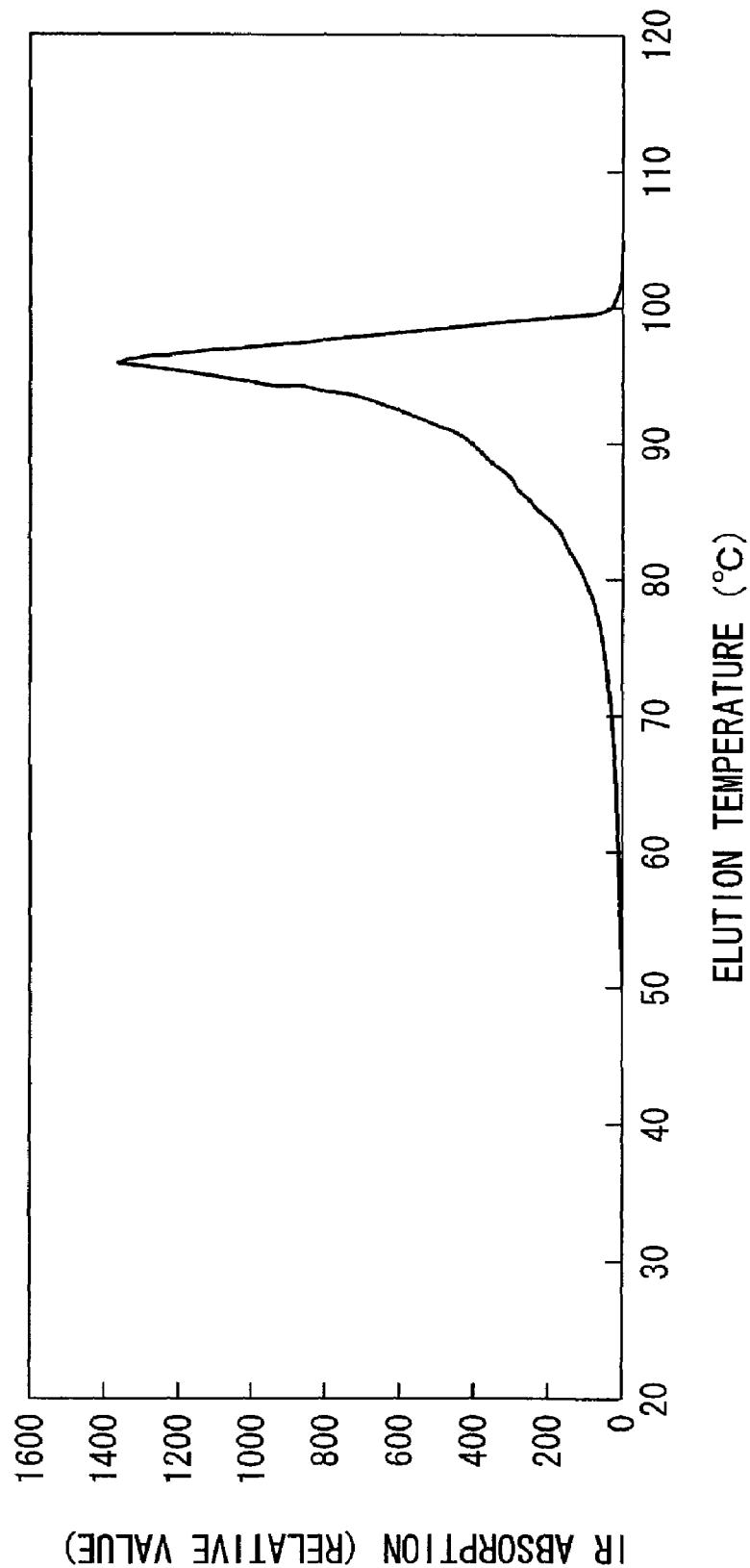
FIG. 4 is a graph showing an elution temperature vs. elution quantity curve for an ethylene copolymer (A2) used in the present invention.

Furthermore, as shown in FIG. 4, although the ethylene copolymer (A2) has a single TREF peak, a conventional ethylene copolymer produced using a typical metallocene based catalyst does not satisfy the equation 2. Consequently, the ethylene copolymer (A2) can be clearly distinguished from a conventional ethylene copolymer (FIG. 3) produced using a typical metallocene based catalyst.

Provided an ethylene copolymer (A) used in the present invention satisfies the above parameters, then there are no particular restrictions on factors such as the catalyst or the production method, and production can be performed using a typical metallocene based catalyst or a CGC catalyst or the like, although a linear low density ethylene copolymer prepared by copolymerization of ethylene and an α-olefin in the presence of a catalyst incorporating an organic cyclic compound with at least a conjugated double bond and a transition metal compound from group IV of the periodic table is preferred. This type of linear low density ethylene copolymer has a narrow molecular weight distribution and a narrow compositional distribution, and consequently is a superior product with excellent mechanical characteristics, which displays excellent initial adhesive strength, durable adhesive strength, and adhesive strength following soak in fuel oil, and also has excellent heat resistance.

It is particularly desirable if this type of linear low density ethylene copolymer is polymerized with a catalyst obtained by mixing the compounds a1 to a4 described below.

a1: a compound represented by a general formula Me1R1pR2q(OR3)rX14-p-q-r wherein, Me1 represents zirconium, titanium or hafnium; R1 and R3 each represent a hydrocarbon group of 1 to 24 carbon atoms; R2 represents a 2,4-pentanedionato ligand or a derivative thereof, a benzoylmethanato ligand, or a benzoylacetonato ligand or a derivative thereof; X1 represents a halogen atom, and p, q and r each represent integers which satisfy the ranges $0 \leq p \leq 4$, $0 \leq q \leq 4$, $0 \leq r \leq 4$, and $0 \leq p+q+r \leq 4$.

a2: a compound represented by a general formula Me2R4m(OR5)nX2z-m-n wherein, Me2 represents an element from group 1 to group 3 of the periodic table; R4 and R5 each represent a hydrocarbon group of 1 to 24 carbon atoms; X2 represents a halogen atom or a hydrogen atom (although if X2 is a hydrogen atom, then Me2 can only be an element from group 3 of the periodic table); z represents the valency of Me2, and m and n each represent integers which satisfy the ranges $0 \leq m \leq z$, $0 \leq n \leq z$, and moreover $0 \leq m+n \leq z$.

a3: an organic cyclic compound with a conjugated double bond.

a4: a modified organic aluminum oxy compound incorporating a Al—O—Al linkage and/or a boron compound.

These compounds are described below in further detail.

In the formula of the catalyst constituent compound a1 represented by the general formula Me1R1pR2q(OR3)rX14-p-q-r, Me1 represents zirconium, titanium or hafnium, and the variety of these transition metals is not restricted, and a plurality of metals may be used, although zirconium is particularly preferred as it produces a copolymer with superior weather resistance. R1 and R3 each represent a hydrocarbon group of 1 to 24 carbon atoms, and preferably 1 to 12 carbon atoms, and even more preferably 1 to 8 carbon atoms. Specific examples include alkyl groups such as methyl groups, ethyl groups, propyl groups, isopropyl groups and butyl groups; alkenyl groups such as vinyl groups and allyl groups; aryl groups such as phenyl groups, tolyl groups, xylyl groups, mesityl groups, indenyl groups and naphthyl groups; and aralkyl groups such as benzyl groups, trityl groups, phenethyl groups, styryl groups, benzhydryl groups, phenylbutyl groups and neophyl groups. These hydrocarbon groups may contain branches. R2 represents a 2,4-pentanedionato ligand or a derivative thereof, a benzoylmethanato ligand, or a benzoylacetonato ligand or a derivative thereof. X1 represents a halogen atom such as a fluorine atom, an iodine atom, a chlorine atom or a bromine atom. p, q, and r each represent integers which satisfy the ranges $0 \leq p \leq 4$, $0 \leq q \leq 4$, $0 \leq r \leq 4$, and $0 \leq p+q+r \leq 4$.

Examples of compounds represented by the general formula of the catalyst constituent a1 include tetramethylzirconium, tetraethylzirconium, tetrabenzylzirconium, tetrapropoxyzirconium, tripropoxymonochlorozirconium, tetraethoxyzirconium, tetrabutoxyzirconium, tetrabutoxytitanium and tetrabutoxyhafnium, and of these Zr(OR)4 compounds such as tetrapropoxyzirconium and tetrabutoxyzirconium are preferred, and two or more of these compounds may also be used in combination. Furthermore, specific examples of the 2,4-pentanedionato ligand or a derivative thereof, benzoylmethanato ligand, or benzoylacetonato ligand or a derivative thereof include tetra(2,4-pentanedionato)zirconium, tri(2,4-pentanedionato)zirconium chloride, di(2,4-pentanedionato)zirconium dichloride, (2,4-pentanedionato)zirconium trichloride, di(2,4-pentanedionato) zirconium diethoxide, di(2,4-pentanedionato)zirconium di-n-propoxide, di(2,4-pentanedionato)zirconium di-n-butoxide, di(2,4-pentanedionato)dibenzylzirconium, di(2,4-pentanedionato)dineophylzirconium, tetra(dibenzoylmethanato)zirconium, di(dibenzoylmethanato) zirconium diethoxide, di(dibenzoylmethanato)zirconium di-n-propoxide, di(dibenzoylmethanato)zirconium di-n-butoxide, di(benzoylacetonato)zirconium diethoxide, di(benzoylacetonato)zirconium di-n-propoxide, and di(benzoylacetonato)zirconium di-n-butoxide.

In the formula of the catalyst constituent compound a2 represented by the general formula Me2R4m(OR5)nX2z-m-n, Me2 represents an element from group 1 to group 3 of the periodic table, such as lithium, sodium, potassium, magnesium, calcium, zinc, boron and aluminum. R4 and R5 each represent a hydrocarbon group of 1 to 24 carbon atoms, and preferably 1 to 12 carbon atoms, and even more preferably 1 to 8 carbon atoms. Specific examples include alkyl groups such as methyl groups, ethyl groups, propyl groups, isopropyl groups and butyl groups; alkenyl groups such as vinyl groups and allyl groups; aryl groups such as phenyl groups, tolyl groups, xylyl groups, mesityl groups, indenyl groups and naphthyl groups; and aralkyl groups such as benzyl groups, trityl groups, phenethyl groups, styryl groups, benzhydryl groups, phenylbutyl groups and neophyl groups. These hydrocarbon groups may contain branches. X2 represents a halogen atom such as a fluorine atom, an iodine atom, a chlorine atom or a bromine atom, or alternatively, a hydrogen atom. However, if X2 is a hydrogen atom then Me2 can only be an element from group 3 of the periodic table such as boron or aluminum or the like. Furthermore, z represents the valency of Me2, and m and n each represent integers which satisfy the ranges $0 \leq m \leq z$, $0 \leq n \leq z$, and moreover $0 \leq m+n \leq z$.

Examples of compounds represented by the general formula of the catalyst constituent a2 include organic lithium compounds such as methyllithium and ethyllithium; organic magnesium compounds such as dimethylmagnesium, diethylmagnesium, methylmagnesium chloride and ethylmagnesium chloride; organic zinc compounds such as dimethylzinc and diethylzinc; organic boron compounds such as trimethylboron and triethylboron; and organic aluminum compounds such as trimethylaluminum, triethylaluminum, tripropylaluminum, triisobutylaluminum, trihexylaluminum, tridecylaluminum, diethylaluminum chloride, ethylaluminum dichloride, ethylaluminum sesquichloride, diethylaluminum ethoxide and diethylaluminum hydride.

The organic cyclic compound with a conjugated double bond of the catalyst constituent compound a3 includes cyclic hydrocarbon compounds with one, or two or more rings with at least two, and preferably 2 to 4, and even more preferably 2 to 3 conjugated double bonds, and with a total number of carbon atoms from 4 to 24, and preferably from 4 to 12; cyclic hydrocarbon compounds similar to those above but partially substituted with 1 to 6 hydrocarbon residues (typically alkyl groups or aralkyl groups of 1 to 12 carbon atoms); organic silicon compounds incorporating a cyclic hydrocarbon group with one, or two or more rings with at least two, and preferably 2 to 4, and even more preferably 2 to 3 conjugated double bonds, and with a total number of carbon atoms from 4 to 24, and preferably from 4 to 12; and organic silicon compounds in which the above cyclic hydrocarbon group is partially substituted with 1 to 6 hydrocarbon residues or alkali metal salts (sodium or lithium salts). Molecules which incorporate a cyclopentadiene structure are particularly preferred.

Specific examples of preferred compounds include cyclopentadiene, indene and azulene, as well as alkyl, aryl, aralkyl, alkoxy and aryloxy derivatives thereof. Furthermore, compounds in which the above compounds are linked (bridged) via an alkylene group (with 2 to 8, and preferably 2 to 3 carbon atoms) can also be used favorably.

Organic silicon compounds with a cyclic hydrocarbon group can be represented by a general formula shown below.

ALSiR4-L

Here, A represents the cyclic hydrocarbon group such as a cyclopentadienyl group, a substituted cyclopentadienyl group, an indenyl group or a substituted indenyl group; R represents either a hydrogen atom or a hydrocarbon residue of 1 to 24 carbon atoms, and preferably 1 to 12 carbon atoms, including alkyl groups such as methyl groups, ethyl groups, propyl groups, isopropyl groups and butyl groups; alkoxy groups such as methoxy groups, ethoxy groups, propoxy groups and butoxy groups; aryl groups such as phenyl groups; aryloxy groups such as phenoxy groups; and aralkyl groups such as benzyl groups; and L represents a number wherein $1 \leq L \leq 4$, and preferably $1 \leq L \leq 3$.

Specific examples of organic cyclic hydrocarbon compounds of the constituent a3 include cyclopolyenes and substituted cyclopolyenes of 5 to 24 carbon atoms such as cyclopentadiene, methylcyclopentadiene, ethylcyclopentadiene, propylcyclopentadiene, butylcyclopentadiene, 1,3-dimethylcyclopentadiene, 1-methyl-3-ethylcyclopentadiene, 1-methyl-3-propylcyclopentadiene, 1-methyl-3-butylcyclopentadiene, 1,2,4-trimethylcyclopentadiene, pentamethylcyclopentadiene, indene, 4-methyl-1-indene, 4,7-dimethylindene, cycloheptatriene, methylcycloheptatriene, cyclooctatetraene, azulene, fluorene and methylfluorene, as well as monocyclopentadienyl silane, biscyclopentadienyl silane, triscyclopentadienyl silane, monoindenyl silane, bisindenyl silane and trisindenyl silane.

A modified organic aluminum oxy compound incorporating a Al—O—Al linkage of the catalyst constituent compound a4 is a modified organic aluminum oxy compound, typically called an aluminoxane, obtained by reacting an alkylaluminum compound with water, and usually comprises 1 to 100, and preferably 1 to 50 Al—O—Al linkages within each molecule. Furthermore, these modified organic aluminum oxy compounds may be either linear type structures or cyclic structures.

The reaction between organic aluminum and water is usually conducted within an inert hydrocarbon. Examples of preferred inert hydrocarbons include aliphatic, alicyclic and aromatic hydrocarbons such as pentane, hexane, heptane, cyclohexane, benzene, toluene and xylene.

The reaction ratio between water and the organic aluminum compound (the water/Al molar ratio) is usually from 0.25/1 to 1.2/1, and preferably from 0.5/1 to 1/1.

Examples of boron compounds include triethylaluminum tetra(pentafluorophenyl)borate, triethylammonium tetra(pentafluorophenyl)borate, dimethylanilinium tetra(pentafluorophenyl)borate, dimethylanilinium tetra(pentafluorophenyl)borate, butylammonium tetra(pentafluorophenyl)borate, N,N-dimethylanilinium tetra(pentafluorophenyl)borate, N,N-dimethylanilinium tetra(3,5-difluorophenyl)borate, trityltetrakispentafluoroborate, ferrocenium tetrakispentafluoroborate, and trispentafluoroborane. Of these, N,N-dimethylanilinium tetra(pentafluorophenyl)borate, trityltetrakispentafluoroborate, ferrocenium tetrakispentafluoroborate, and trispentafluoroborane are preferred.

The above catalyst constituents a1 to a4 can be mixed together prior to use, although preferably they should be supported on an inorganic support and/or a particulate polymer support (a5) prior to use.

The inorganic support and/or a particulate polymer support (a5) refers to a carbonaceous material, a metal, a metal oxide, a metal chloride, a metal carbonate or a mixture of such materials, or alternatively a thermoplastic resin or a thermosetting resin. Examples of suitable metals for use as this type of inorganic support include iron, aluminum, and nickel and the like.

Specific examples of suitable materials include $SiO_2$, $Al_2O_3$, $MgO$, $ZrO_2$, $TiO_2$, $B_2O_3$, $CaO$, $ZnO$, $BaO$, $ThO_2$, or mixtures thereof such as $SiO_2$—$Al_2O_3$, $SiO_2$—$V_2O_5$, $SiO_2$—$TiO_2$, $SiO_2$—$MgO$, and $SiO_2$—$Cr_2O_3$. Of these, materials comprising at least one material selected from the group consisting of $SiO_2$ and $Al_2O_3$ as a primary constituent are preferred.

Furthermore, in terms of organic compounds, both thermoplastic resins and thermosetting resins can be used, and specific examples include particulate polyolefins, polyesters, polyamides, polyvinyl chlorides, poly methyl (meth)acrylates, polystyrenes, polynorbornenes and the various natural macromolecules, as well as mixtures thereof.

The inorganic support and/or a particulate polymer support can be used as is, although preferably a pretreatment should be performed wherein the support is contacted with an organic aluminum compound or a modified organic aluminum compound comprising Al—O—Al linkages prior to being used as the constituent a5.

An ethylene copolymer (A) according to the present invention can be produced by a gas phase polymerization method with essentially no solvent, a slurry polymerization method, or a solution polymerization method, in the presence of the catalyst. Specifically, the ethylene copolymer (A) is produced in an environment free of oxygen and water, either in the presence of an inert hydrocarbon solvent including aliphatic hydrocarbons such as butane, pentane, hexane or heptane, aromatic hydrocarbons such as benzene, toluene or xylene, and alicyclic hydrocarbons such as cyclohexane or methylcyclohexane, or alternatively may be produced without such a solvent. There are no particular restrictions on the production conditions, although the polymerization temperature is typically from 15 to 350° C., and preferably from 20 to 200° C., and even more preferably from 50 to 110° C., the polymerization pressure in the case of a low or medium pressure method is typically from atmospheric pressure to 70 kg/cm$^2$G, and preferably from atmospheric pressure to 20 kg/cm$^2$G, and in the case of a high pressure method is preferably no more than 1500 kg/cm$^2$G. The polymerization time in the case of a low or medium pressure method is typically from 3 minutes to 10 hours, and preferably from 5 minutes to approximately 5 hours, and in the case of a high pressure method is typically from 1 minute to 30 minutes, and preferably from 2 minutes to approximately 20 minutes. Furthermore, the polymerization may be performed via a one stage polymerization, or via a multi-stage polymerization with two or more stages in which polymerization conditions such as the hydrogen concentration, the monomer concentration, the polymerization pressure, the polymerization temperature and the catalyst differ between stages. The method disclosed in Japanese Unexamined Patent Application, First Publication No. Hei 5-132518 represents a particularly preferred production method.

In producing an ethylene copolymer (A) used in the present invention, by using a catalyst in which the catalyst constituents contain no halogens such as chlorine, a product can be obtained in which the halogen concentration is no more than 10 ppm, and preferably no more than 5 ppm, and even more preferably is essentially halogen free (ND: no more than 2 ppm). By using this type of chlorine or halogen free ethylene copolymer (A), the need for a conventional acid neutralizing agent (halogen absorbing agent) such as calcium stearate or hydrotalcite disappears. Consequently, the reduction in adhesive strength caused by the inclusion of these additives can be avoided.

[Adhesive Resin Composition (C)]

An adhesive resin composition (C) is formed from the modified polyethylene (A) and an unmodified polyethylene (B), and comprises from 100 to 5% by mass of the modified polyethylene (A), and from 0 to 95% by mass of the unmodified polyethylene (B). Preferred ratios (A)/(B) for the modified polyethylene (A) and the unmodified polyethylene (B) are from 10/90 to 90/10 (mass ratios), with ratios from 15/85 to 85/15 being even more desirable. Provided the ratio (A)/(B) is within the range from 10/90 to 90/10, then the concentration of the product adhesive resin composition can be adjusted, and the low impact resistance of a regrind layer during recycling can be balanced.

Furthermore, the ratio MFR(A)/MFR(B), where MFR(A) represents the MFR for the modified polyethylene (A) at a temperature of 190° C. and a loading of 2.16 kg, and MFR(B) represents the MFR for the unmodified polyethylene (B) at a temperature of 190° C. and a loading of 2.16 kg, should preferably be less than 1, and even more preferably less than 0.6. If the ratio MFR(A)/MFR(B) exceeds 1, then the adhesive strength initially, and following soak in fuel, may deteriorate.

A preferred state for the adhesive resin composition (C) comprises 100 to 5% by mass of a modified polyethylene (a), and in particular a high density polyethylene with a MFR of 0.1 to 2 g/10 minutes and a density of 0.93 to 0.96 g/cm$^3$, 0 to 95% by mass of an unmodified polyethylene (b), and in particular a high density polyethylene with a MFR of 0.1 to 20 g/10 minutes and a density of 0.93 to 0.96 g/cm$^3$, no more than 70% by mass, and preferably 5 to 60% by mass, and even more preferably 10 to 50% by mass of a linear low density polyethylene (c) with a MFR of 0.1 to 2 g/10 minutes and a density of 0.91 to 0.94 g/cm$^3$. Furthermore, the content of an ultra low density polyethylene (d) with a MFR of 0.1 to 2 g/10 minutes and a density of 0.86 to 0.91 g/cm$^3$ should be no more than 50% by mass, and preferably from 5 to 40% by mass, and even more preferably from 10 to 35% by mass. By forming an adhesive resin composition from this type of mixture, the compatible with the modified polyethylene (A) and the unmodified polyethylene (B) is good, and a composition with balanced properties can be achieved including good initial adhesion, durable adhesion, low temperature impact resistance and fuel oil swelling resistance, and good compatible with a low temperature impact resistant regrind composition of a regrind layer produced on recycling of the adhesive resin composition.

A production method for the adhesive resin composition (C) involves molten mixing of a raw material mixture incorporating a modified polyethylene (A) and an unmodified polyethylene (B). There are no particular restrictions on the molten mixing method, and for example, the raw materials can be mixed in a conventional mixer such as a Henschel mixer, followed by molten mixing using either a single screw or a double screw extruder. Furthermore, solution methods in which the mixture is dissolved in a solvent and modification is then conducted are also effective methods.

The thus obtained adhesive resin composition (C) has a density of 0.925 to 0.940 g/cm$^3$, an unsaturated carboxylic acid and unsaturated carboxylic acid derivative content of at least 0.09% by mass, and a MFR at a temperature of 190° C. and a loading of 2.16 kg of 0.1 to 2.0 g/10 minutes, and preferably 0.1 to 1.5 g/10 minutes.

If the density is less than 0.925 g/cm$^3$, then the degree of swelling relative to fuel oil and the like increases, and consequently the long term durability (the adhesive strength following soak in fuel oil) deteriorates. In contrast, if the density exceeds 0.940 g/cm$^3$, then the contraction during solidification following the molding of a multi-layer laminated structure increases, leading to a decrease in the adhesive strength.

Furthermore, if the content of the unsaturated carboxylic acid and unsaturated carboxylic acid derivative is less than 0.09% by mass, then the adhesive strength of the final product multi-layer laminated structure deteriorates. Furthermore, in cases in which molding burrs and unused parison is recycled and used as a regrind layer, the compatible of the regrind layer and the barrier material such as a saponified product of an ethylene-vinyl acetate copolymer, or a polyamide resin also deteriorates, and consequently the low temperature impact resistance of the final product multi-layer laminated structure falls.

Furthermore, if the MFR is less than 0.1 g/10 minutes or exceeds 2 g/10 minutes, then the moldability of the obtained adhesive resin composition (C) deteriorates.

A characteristic of the present invention is the fact that in the adhesive resin composition (C), the rate of ring opening of acid anhydride groups following modification should preferably be maintained at a value of no more than 10%. By ensuring that the rate of ring opening of acid anhydride groups following graft modification of the adhesive resin composition is maintained at no more than 10%, it was discovered that the reaction with the saponified product of an ethylene-vinyl acetate copolymer or the like of the barrier resin can be promoted, thereby improving the initial adhesive strength and the adhesive strength following soak in fuel oil, as well as the degree of swelling following soak in fuel oil. Furthermore, in the case of subsequent use as a regrind layer during recycling, the compatible with the barrier materials such as saponified products of ethylene-vinyl acetate copolymers, or polyamide resins also improves.

Where necessary, additives and other resins may be combined with an adhesive resin composition (C). Examples of additives include phenol based and phosphorus based antioxidants, antiblocking agents such as talc, and slipping agents such as fatty acid amides and the like.

However, fatty acid metal salts such as calcium stearate or zinc stearate which are typically used as acid absorbers inhibit the reaction between unsaturated carboxylic acids and unsaturated carboxylic acid derivatives such as succinic acid which modify the polyethylene, and polyamides or saponified products of ethylene-vinyl acetate copolymers. Accordingly, in those cases in which a fatty acid metal salt is used, the amount added should preferably be no more than 100 ppm.

Quantities of no more than 50 ppm are even more preferred, and amounts less than the detection limit of quantitative analysis using X-ray fluorescence analysis are particularly preferred. If the content of fatty acid metal salts added is less than 100 ppm, then the adhesive strength of the adhesive resin composition can be further improved, and the mechanical characteristics of a multi-layer laminated structure can also be further improved. Furthermore, synthetic or natural hydrotalcite can also be used as an acid absorber instead of stearate based compounds.

Examples of other resins include homopolymers formed from ethylene, copolymers formed from ethylene and an α-olefin of 3 to 12 carbon atoms, and copolymers formed from ethylene and other vinyl monomers such as ethylene-vinyl acetate copolymers, ethylene-acrylic acid copolymers, ethylene-methacrylic acid copolymers, ethylene-methylacrylate copolymers, ethylene-ethylacrylate copolymers, ethylene-butylacrylate copolymers, and ethylene-methylmethacrylate copolymers. Examples of the above α-olefin include propylene, 1-butene, 1-hexene, 4-methyl-1-pentene and 1-octene.

These polymers may be produced by high pressure radical methods, by using a typical Ziegler catalyst or a chromium catalyst, or by using a so-called single site catalyst.

Furthermore, a preferred form of an adhesive resin composition (C) of the present invention should preferably satisfy the following conditions.

Namely, 6.7% by mass of an adhesive resin composition (C), 88.3% by mass of a high density polyethylene (Japan Polyolefins Co. Ltd., KBY47C) with a density of 0.945 g/cm³ and a high load melt flow rate (temperature 190° C., load 21.6 kg) of 6 g/10 minutes, and 5% by mass of a saponified product of an ethylene-vinyl acetate copolymer (Kuraray Co. Ltd., EVAL F101B) are subjected to molten kneading, and press molding of the kneaded product thus obtained, at a temperature setting of 230° C. and a press pressure of 6 MPa, is then used to prepare a sheet of thickness 4 mm, and when the WV notch tensile impact strength of a test specimen of a shape 1 according to JIS K7160 prepared from this sheet is measured at −40° C., the WV notch tensile impact strength should preferably be at least 120 KJ/cm².

The proportions described above represent the proportions of a typical recycled composition (regrind composition) during recycling. During recycling, by using an adhesive resin composition, the low temperature impact resistance of multi-layer laminated structures such as 4 type 6 layer structures and 3 type 5 layer structures using recycled burrs from multi-layer molding and unused parison can be improved.

In the molten kneading, the C1-C2-C3-head-dice temperature settings should preferably be set to 180° C.-200° C.-200° C.-200° C.-200° C. respectively, and a 50 mm single screw kneader with the screw revolutions adjusted to 60 rpm should preferably be used.

Evaluation of the low temperature impact resistance includes a method in which an actual molded product is dropped within a low temperature environment, although the measurement operation in this method is quite demanding, and consequently measurements are typically conducted as −40° C. Charpy impact strength measurements on a flat specimen.

[Multi-Layer Laminated Structure]

A multi-layer laminated structure which represents another aspect of the present invention is produced using an adhesive resin composition of the type described above. In other words, the multi-layer laminated structure comprises an adhesive layer formed from an adhesive resin composition, and at least a principal material layer formed on the outside of the adhesive layer, and a barrier layer formed on the inside of the adhesive layer.

There are no particular restrictions on the thickness of the adhesive layer, although thickness values from 50 to 300 μm are preferred, and values of 100 to 200 μm are even more desirable. At thickness values less than 50 μm, the adhesiveness with the barrier layer and the principal material layer may be unsatisfactory, whereas at values exceeding 300 μm, the rigidity of the multi-layer laminated structure itself deteriorates.

[Principal Material Layer]

There are no particular restrictions on the material of the principal material layer provided sufficient impact resistance is imparted to the final product multi-layer laminated structure, and suitable materials include layers of a high density polyethylene or a linear low density polyethylene, although a high density polyethylene should preferably be used. This high density polyethylene is selected from materials with a density of 0.93 to 0.97 g/cm³, and a melt flow rate of 0.01 to 50 g/10 minutes and preferably 0.1 to 10 g/10 minutes.

In another form, the principal material layer can use a regrind material produced from recycled burrs and rejected products produced during molding of the molded product such as a fuel vessel or the like. Depending on the situation, this regrind material may be used as is, or may also be blended with the high density polyethylene.

The thickness of the principal material layer will vary depending on the intended use of the final product, although will typically be selected from within a range from 50 to 1,000 μm.

[Barrier Layer]

The barrier layer is a layer for preventing penetration of fuel oil or the like. Examples of resins used for barrier layers include a variety of synthetic resin materials including various polyamide resins such as nylon 6 and nylon 6,6, various hydroxy group containing resins such as saponified products of ethylene-vinyl acetate copolymers, various polyester resins such as polyethylene terephthalate resins and polybutylene terephthalate resins, and various halogen containing resins such as polyvinyl chloride resins and polyvinylidene chloride resins. In addition, metal materials such as aluminum and iron may also be used.

Of these materials, polyamide based resins and saponified products of ethylene-vinyl acetate copolymers are used in preference due to their high barrier properties.

There are no particular restrictions on the thickness of the barrier layer, although thickness values from 50 to 300 μm are preferred. At thickness values less than 50 μm, there is a risk of fuel oil or the like penetrating through the layer when the multi-layer laminated structure is filled with the fuel oil or the like, whereas at values exceeding 300 μm, the amount of the highly priced barrier resin used increases, causing an increase in the cost of the multi-layer laminated structure.

[Layer Configuration]

A multi-layer laminated structure of the present invention may utilize recycled material produced by grinding up burrs and unmolded parison generated during the molding of laminated vessels and the like, other than the barrier layer, the adhesive layer and the principal material layer, with this recycled material being mixed with the material of the principal material layer. Furthermore, recycled material produced by grinding up burrs and unmolded parison may also be used as a regrind layer formed between the principal material layer and the adhesive layer.

The multi-layer laminated structure should preferably be of a sandwich type structure with at least a layer comprising a polyethylene based resin as the main constituent provided on the outside of the adhesive resin composition, and a layer formed from a polyamide resin or a saponified product of an ethylene-vinyl acetate copolymer (hereafter abbreviated as EVOH) formed on the inside of the adhesive resin composition.

Examples of layer configurations of the multi-layer laminated structure, listed in sequence from the innermost layer, include 3 type 3 layer structures comprising principal material layer/adhesive layer/principal material layer; 3 type 5 layer structures comprising principal material layer/adhesive layer/barrier layer/adhesive layer/principal material layer, barrier layer/adhesive layer/principal material layer/adhesive layer/barrier layer, or (principal material layer+regrind layer)/adhesive layer/barrier layer/adhesive layer/(principal material layer+regrind layer); and 4 type 6 layer structures comprising principal material layer/adhesive layer/barrier layer/adhesive layer/regrind layer/principal material layer, or principal material layer/regrind layer/adhesive layer/barrier layer/adhesive layer/principal material layer.

In particular 3 type 5 layer structures comprising a high density polyethylene layer and/or a regrind layer/an adhesive resin composition layer/a saponified product of an ethylene-vinyl acetate copolymer layer/an adhesive resin composition layer/and a high density polyethylene layer and/or a regrind layer are preferred.

[Production Method for Multi-Layer Laminated Structure]

There are no particular restrictions on the production method used for producing a multi-layer laminated structure of the present invention, and following formation of a multi-layer laminate via coextrusion molding, the multi-layer laminate is molded to form a multi-layer laminated structure.

Examples of suitable methods for forming a multi-layer laminate and converting this to a multi-layer laminated structure include blow molding methods, vacuum molding methods, injection molding methods, compression molding methods, and extrusion molding methods, and of these, blow molding is the most preferred method for large scale fuel vessels and the like.

Figure 5:
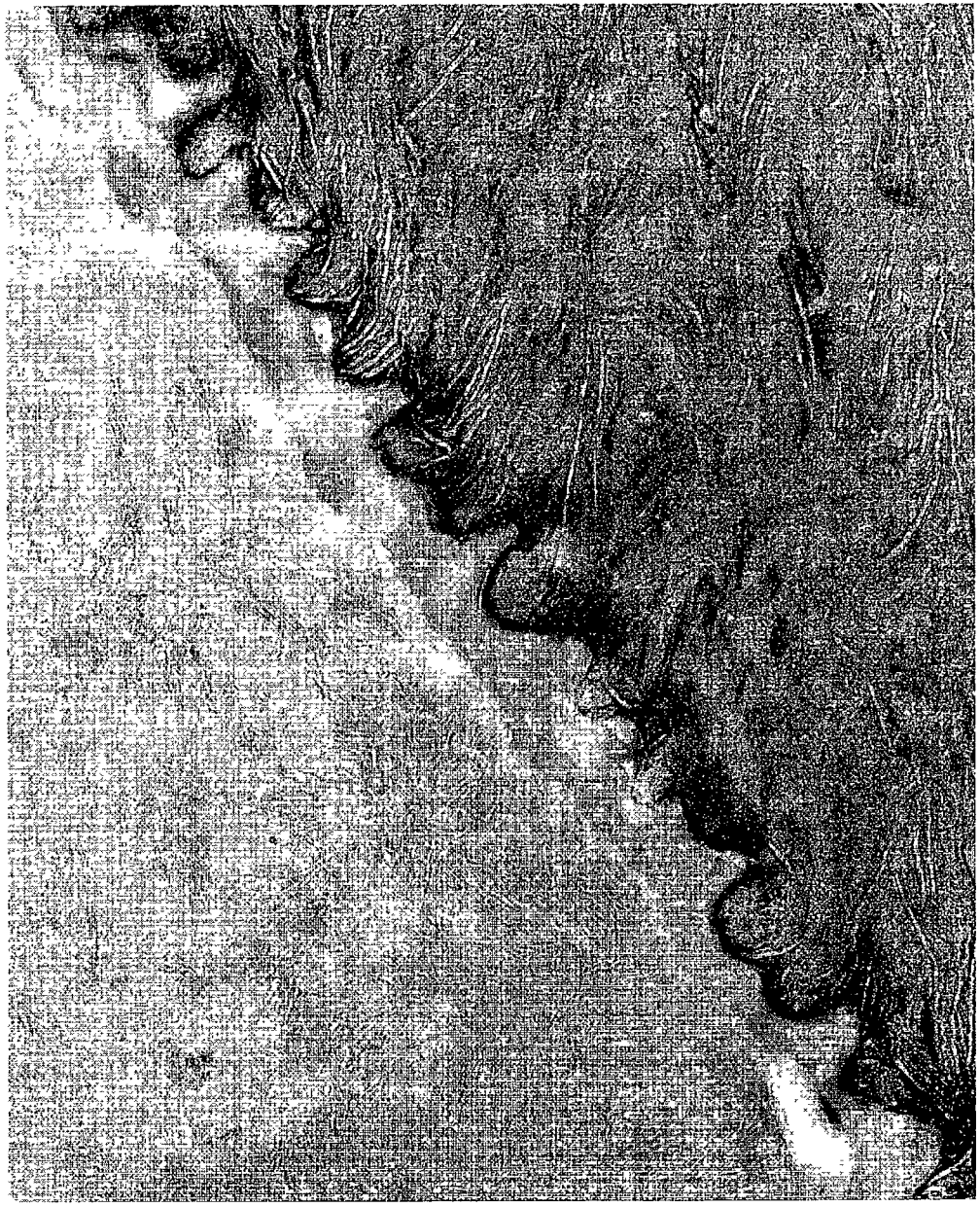
FIG. 5 shows an electron microscope photograph 1 (captured at a magnification of 40,000×using a transmission electron microscope) of an interface structure between an adhesive resin composition of the present invention and a principal material layer.

A characteristic of a multi-layer laminated structure of the present invention, is that when an adhesive resin composition layer, and a high density polyethylene and/or a regrind layer of a principal material layer are subjected to coextrusion molding using the multi-layer blow molding device to form a 3 type 5 layer material, because a high molecular weight modified high density polyethylene (a) is used, the adhesion interface with the saponified product of an ethylene-vinyl acetate copolymer of the barrier layer is formed as an irregular surface. As shown in an electron microscope photograph (1) in FIG. 5, when the structure of this interface between the adhesive resin composition and the barrier layer is viewed with a transmission electron microscope at a magnification within a range from 20,000× to 50,000× (40,000× in this case), irregularities with an elevation difference of at least 100 nm are visible.

In the present invention the adhesion interface adopts this type of irregular structure. This phenomenon is believed to be due to the fact that because the ring opening ratio of the anhydride, and preferably maleic anhydride, is small, the reaction with hydroxyl groups of the EVOH at the interface is accelerated, and because the molecular weight of the adhesive resin is large, the fluid viscosity changes rapidly, and the accompanying contraction causes distortions and irregularities to form in the interface structure. It is thought that as a result of this irregular structure, the adhesive resin and the EVOH generate an anchoring effect at the interface, causing a synergic increase in the initial adhesive strength, the durable adhesive strength (the adhesive strength following soak in fuel oil), and the resistance to swelling following soak in fuel oil.

Figure 6:
FIG. 6 shows an electron microscope photograph 2 (captured at a magnification of 40,000×using a transmission electron microscope) of an interface structure between a conventional adhesive resin composition and a principal material layer.

In contrast, in a conventional structure using an adhesive resin composition, these types of irregularities with an elevation difference of at least 100 nm are not visible (using a transmission electron microscope at a magnification of 40,000), and the interface is essentially linear as shown in the electron microscope photograph (1) of FIG. 6, and as a result there is no improvement in the adhesive strength.

In molding via a multi-layer blow molding method, the two layers, namely a molten barrier layer formed from a saponified product of an ethylene-vinyl acetate copolymer, a polyamide based resin, a polyester based resin or a polyvinylidene chloride based resin or the like, and a similarly molten adhesive resin composition layer, are brought in contact inside the die of a multi-layer blow molding device, and subsequently blown. The adhesion between the two layers is essentially concluded during this period of molten contact. The adhesive material used in the present invention has a considerably large molecular weight, and similarly the high density polyethylene of the principal material layer also has a large molecular weight. Furthermore, the adhesion mechanism is also a phenomenon of mass transfer. Accordingly, if there is no movement of acid modified resin molecules at the adhesion interface, then no adhesion will be exhibited between the two layers. As a result, ensuring a molten contact which lasts for at least a certain length of time is favorable in terms of producing good adhesive strength. When an adhesive resin composition of the present invention is used in a large scale multi-layer hollow molded product such as the fuel tank or the like, this length of time is defined as being the time from when the adhesive resin layer and the barrier layer come into molten state contact inside the die, until a multi-layer parison coextruded therefrom is blown, contacts a blow mold, and begins to cool. Specifically, this molten contact time should be at least 10 seconds, and preferably at least 15 seconds, and even more preferably at least 20 seconds. There are no particular restrictions on the upper limit for this time, although very long contact times offer little in terms of further increases in adhesive strength, and simply result in an equivalent reduction in production efficiency. Typically, the upper limit is set at 2 to 3 minutes. Needless to say, when a plurality of interfaces exist between adhesive resin composition layers and barrier layers, the above relationship should preferably be established at each of the interfaces. The same can be assumed for the interface between the adhesive material layer and the principal material layer, although in the case of the present invention, the base resin in both layers is a polyolefin, and consequently the mutual adhesion itself is comparatively good. As a result, it is preferable that the above relationship is established for contact between different materials, namely the adhesive resin layer and the barrier layer.

[Applications]

This type of multi-layer laminated structure according to the present invention can be used favorably for fuel tanks (vessels) such as gasoline tanks for filling with fuel oil, tanks for holding chemicals and solvents and the like, vessels such as tanks for holding industrial chemicals, and foodstuff vessels for holding cooking oils or detergents or the like.

In particular, a multi-layer laminated structure of the present invention displays excellent resistance to swelling on soak in fuel oil and also displays excellent adhesive strength following soak in fuel oil, and is consequently very useful as a fuel tank (vessel).

EXAMPLES

As follows is a more detailed description of the present invention based on a series of examples. The resins used are described below.

A [linear low density polyethylene (c) produced using a single site catalyst] and an [ultra low density polyethylene (d)] utilized materials prepared by polymerization in the following manner.

An ethylene copolymer (A1) of the present invention was polymerized using the method below.

[Solid Catalyst Preparation]

To a catalyst preparation device equipped with an electromagnetic induction stirrer, 1000 ml of toluene purified under an nitrogen atmosphere, 26 g of tetrapropoxyzirconium $(Zr(OPr)_4)$, 22 g of indene, and 88 g of methylbutylcyclopentadiene were placed, and with the temperature maintained at 90° C., 100 g of tripropylaluminum was added dropwise over a period of 100 minutes, and the mixture was then reacted for 2 hours at the same temperature. Following cooling to 40° C., 2,424 ml of a toluene solution of methylalumoxane (concentration: 3.3 mol/l) was added and stirred for 2 hours. Next, 2,000 g of silica (surface area: 300 m$^2$/g) which had been subjected, in advance, to 5 hours baking at 450° C. was added, and following stirring for one hour at room temperature, the mixture was blown with nitrogen and dried under reduced pressure at 40° C., yielding a solid catalyst (i) with good fluidity.

[Gas Phase Polymerization]

Using a continuous fluidized bed gas polymerization device, copolymerization of ethylene and 1-hexene was conducted at a polymerization temperature of 65° C. and with a total pressure of 20 kgf/cm$^2$G. The polymerization was performed by supplying the solid catalyst (i) continuously, while ethylene, 1-hexene and hydrogen were supplied so as to maintain a predetermined molar ratio, and yielded an ethylene copolymer (A1). The results of measurements of the physical properties of this copolymer are shown in Table 1.

An ethylene copolymer (A2) was prepared by polymerization using the following method.

[Solid Catalyst Preparation]

[Solid Catalyst (ii)]

To a catalyst preparation device equipped with an electromagnetic induction stirrer, 1,000 ml of toluene purified under an nitrogen atmosphere, 26 g of tetrapropoxyzirconium (Zr(OPr)$_4$), 74 g of indene, and 78 g of methylpropylcyclopentadiene were placed, and with the temperature maintained at 90° C., 100 g of tripropylaluminum was added dropwise over a period of 100 minutes, and the mixture was then reacted for 2 hours at the same temperature. Following cooling to 40° C., 2,133 ml of a toluene solution of methylalumoxane (concentration: 3.3 mol/l) was added and stirred for 2 hours. Next, 2,000 g of silica (surface area: 300 m$^2$/g) which had been subjected, in advance, to 5 hours baking at 450° C. was added, and following stirring for one hour at room temperature, the mixture was blown with nitrogen and dried under reduced pressure at 40° C., yielding a solid catalyst (ii) with good fluidity.

[Gas Phase Polymerization]

Using a continuous fluidized bed gas polymerization device, copolymerization of ethylene and 1-hexene was conducted at a polymerization temperature of 80° C. and with a total pressure of 20 kgf/cm$^2$G. The polymerization was performed by supplying the solid catalyst (ii) continuously, while ethylene, 1-hexene and hydrogen were supplied so as to maintain a predetermined molar ratio, and yielded an ethylene copolymer (A2). The results of measurements of the physical properties of this copolymer are shown in Table 1.

[Test Methods]

Methods for the aforementioned tests are as described below.

[Density]

Measured in accordance with JIS K6760.

[MFR]

Measured in accordance with JIS K6760

[Mw/Mn]

Measured using a GPC (model 150C, manufactured by Waters Corporation), and using ODCB at 135° C. as the solvent. The column used was a HT806M, manufactured by Shodex Co., Ltd.

[TREF]

With a column maintained at 140° C., a sample was injected into the column, and the temperature was then lowered to 25° C. at a cooling rate of 0.1° C./minute, causing the polymer to become deposited on the glass beads. The temperature of the column was then raised under the following conditions, and the polymer concentration eluted at each temperature was detected by an infrared detector (solvent: ODCB, flow rate: 1 ml/minute, rate of temperature increase: 50° C./hour, detector: infrared spectrometer (wavelength 2,925 cm$^{-1}$), column: 0.8 cm$\phi$×12 cmL (filled with glass beads), sample concentration: 0.05% by mass).

[Halogen Concentration]

Halogen concentration was measured using an X-ray fluorescence method, and in cases in which at least 10 ppm of chlorine was detected, the detected value was used as the analysis result. In the case of a result less than 10 ppm, measurement was performed using a chlorine and sulfur analysis device, model TOX-100 manufactured by Dyer Instruments (Ltd.), and results less than 2 ppm were recorded as ND, indicating an essentially halogen free material.

(Amount X of ODCB soluble fraction)

0.5 g of sample in 20 ml of ODCB was heated at 135° C. for 2 hours, and following complete dissolution of the sample, the solution was cooled to 25° C. The solution was then left to stand overnight at 25° C., and was then filtered through a Teflon filter and the filtrate collected. The absorption peak strength of the asymmetric stretching vibration of methylene at a wave number of approximately 2925 cm$^{-1}$ of the filtrate which is sample solution was measured with an infrared spectrometer. Then, the sample concentration was then calculated from a previously prepared calibration curve. This value determined the content of the ODCB soluble fraction at 25° C.

($T_{ml}$ by DSC)

A sheet of thickness 0.2 mm was prepared using a hot press method, punching out an approximately 5 mg sample from the sheet, and then holding the sample at a temperature of 230° C. for 10 minutes, cooling the temperature to 0° C. at a rate of 2° C. per minute, and then raising the temperature to 70° C. again at a rate of 10° C. per minute, with the melting point ($T_{ml}$) then being defined as the temperature of the apex of the highest temperature peak.

(Melt tension: MT)

MT was determined by measuring the stress using a strain gauge when a melt resin was elongated with a fixed rate. A polymer in a pellet shape which is obtained by pelletization was used as a test sample, and MT measuring machine marketed by Toyo Seiki Seisaku-Sho, Ltd was used as the strain gauge. The orifice used for measuring has a diameter of 2.09 mm ø and a length of 8 mm. The stress was measured under conditions in that a temperature of resin was 190° C., a cylinder descending rate was 20 mm/mm., and a winding rate was 15 m/mm.

TABLE 1

| | | Type of Resin | |
|---|---|---|---|
| | | A1 sLLDPE | A2 sLLDPE |
| | | Type of Catalyst | |
| | | single site | single site |
| (1) | Density (g/cm³) | 0.906 | 0.930 |
| (2) | MFR (g/10 min.) | 1.1 | 1.0 |
| (3) | Mw/Mn | 2.5 | 2.8 |
| (4) | T75 − T25 | 24.2 | 13.2 |
| (4) | (equation 1) − 670 × d + 644 | 37.0 | 20.9 |
| (5) | (equation 2) − 300 × d + 285 | 13.2 | 6.0 |
| (6) | ODCB soluble fraction (% by mass) | 3.1 | 0.3 |
| (6) | (equation 3) d − 0.008LogMFR | 0.906 | 0.930 |
| (6) | (equation 4) 9.8 × 10³ × (0.9300 − d + 0.008logMFR)² + 2.0 | 7.8 | 2.0 |
| (7) | number of TREF peaks | 3 | 2 |
| (7) | TREF peak temperatures (° C.) | 59, 81, 94 | 88, 97 |
| (8) | Number of DSC peaks | 3 | 1 |
| (8) | DSC melting points (° C.) T1 | 91.2 | 124.4 |
| | T2 | 119.4 | |
| | T3 | 122.7 | |
| (8) | Tml (° C.) | 122.7 | 124.4 |
| (8) | (equation 5) 150 × d − 19 | 118.9 | 122.5 |
| (9) | MT | 0.70 | 0.70 |
| (9) | LogMT | −0.15 | −0.15 |
| (9) | (equation 6) − 0.572 × LogMFR + 0.3 | 0.276 | 0.300 |
| (10) | halogen concentration (ppm) | ND | ND |
| (11) | additives included (antioxidants, neutralizers) | none | none |

The resins used in the present invention are listed in the Table 2 below.

TABLE 2

[Resins Used]

| No | Resin used | *) Catalyst type | Abbreviated name | Density g/cm³ | MFR g/10 min. | Brand | Manufacturer |
|---|---|---|---|---|---|---|---|
| 1 | high density polyethylene | Z type | HDPE1 | 0.956 | 0.80 | J-Rex-HD | Japan Polyolefins Co. Ltd |
| 2 | high density polyethylene | Z type | HDPE2 | 0.951 | 0.73 | J-Rex-HD | Japan Polyolefins Co. Ltd |
| 3 | linear low density polyethylene | Z type | LLDPE1 | 0.928 | 0.80 | J-Rex-LL | Japan Polyolefins Co. Ltd |
| 4 | linear low density polyethylene | Z type | LLDPE2 | 0.923 | 2.00 | J-Rex-LL | Japan Polyolefins Co. Ltd |
| 5 | linear low density polyethylene | Z type | LLDPE3 | 0.923 | 0.80 | J-Rex-LL | Japan Polyolefins Co. Ltd |
| 6 | linear low density polyethylene | Z type | LLDPE4 | 0.930 | 4.00 | J-Rex-LL | Japan Polyolefins Co. Ltd |
| 7 | linear low density polyethylene | Z type | LLDPE5 | 0.923 | 8.00 | J-Rex-LL | Japan Polyolefins Co. Ltd |
| 8 | linear low density polyethylene | Z type | LLDPE6 | 0.927 | 0.90 | J-Rex-LL | Japan Polyolefins Co. Ltd |
| 9 | linear low density polyethylene | Z type | LLDPE7 | 0.921 | 30.0 | J-Rex-LL | Japan Polyolefins Co. Ltd |
| 10 | linear low density polyethylene | S type | sLLDPE (A2) | 0.930 | 1.0 | Polymerized | |
| 11 | ultra low density polyethylene | M type | mLLDPE | 0.908 | 1.00 | Affinity PL1840 | Dow Plastics Ltd |
| 12 | ultra low density polyethylene | Z type | zVLDPE | 0.904 | 0.89 | J-Rex-VL | Japan Polyolefins Co. Ltd |
| 13 | ultra low density polyethylene | S type | sVLDPE (A1) | 0.902 | 1.00 | Polymerized | |
| 14 | ultra low density polyethylene | S type | sVLDPE (A1) | 0.906 | 1.10 | Polymerized | |

Z type: Ziegler type catalyst,
S type: single site catalyst,
M type: metallocene catalyst)

[Production of Modified Polyethylene]

The modified polyethylenes used in the examples and the comparative examples (hereafter also referred to as modified resins) were prepared in the manner described below.

(Modified Resin 1)

To 100 parts of a high density polyethylene (HDPE1) with a density of 0.956 g/cm³ and a MFR at temperature 190° C. and loading 2.16 kg of 0.80, 0.015 parts of 2,5-dimethyl-2,5-t-butylperoxyhexane was added, and the mixture was then dry blended for one minute in a Henschel mixer. Subsequently, 0.375 parts of maleic anhydride was added, and following a further 2 minutes of dry blending, the mixture was subjected to molten kneading at 260° C. using a 50 mm single screw extruder manufactured by Modern Machinery (Ltd.), and yielded a modified polyethylene (modified resin 1). In this modified polyethylene, the content of grafted maleic anhydride was 0.30% by mass. The density and MFR of the original polyethylene, and the content of grafted maleic anhydride (labeled MAH content in the table) are shown in Table 3.

(Modified Resin 2, Modified Resin 3)

With the exception of altering the raw material polyethylene to the polyethylenes shown in Table 3, production was performed under identical conditions to the modified resin 1. The density and MFR of the original polyethylenes, and the content of grafted maleic anhydride are shown in Table 3.

(Modified Resin 4)

To 100 parts of a high density polyethylene (HDPE1) with a density of 0.956 g/cm³ and a MFR of 0.80, 0.015 parts of 2,5-dimethyl-2,5-t-butylperoxyhexane was added, and the mixture was then dry blended for one minute in a Henschel mixer. Subsequently, 0.60 parts of maleic anhydride was added, and the mixture was dry blended for a further 2 minutes. The mixture was then subjected to molten kneading at 290° C. using a 50 mm single screw extruder manufactured by Modern Machinery (Ltd.), and yielded a modified polyethylene (modified resin 4). In this modified polyethylene, the content of grafted maleic anhydride was 0.43% by mass. The density and MFR of the original polyethylene, and the content of grafted maleic anhydride are shown in Table 3.

(Modified Resin 5, Modified Resin 6, and Modified Resin 10 to Modified Resin 11)

With the exception of altering the raw material polyethylene to the polyethylenes shown in Table 3, production was performed under identical conditions to the modified resin 4. The density and MFR of the original polyethylenes, and the content of grafted maleic anhydride are shown in Table 3.

The raw material polyethylene used in a modified resin 7, a modified resin 8 and a modified resin 9, utilized a pre-blended mixture of two types of polyethylene shown in Table 3.

Examples 1 to 13 and Comparative Examples 1 to 12

The antioxidants and acid absorbers shown in Table 6 were added to the compositions shown in Table 4 to Table 5, and adhesive resin compositions were then produced by molten kneading at 200° C. using a 50 mm single screw extruder manufactured by Modern Machinery (Ltd.). The antioxidants and acid absorbers were added in accordance with an additives recipe 1 shown below for the examples 1 to 13 and the comparative examples 1 to 10, in accordance with an additives recipe 2 shown below for the comparative example 11, an in accordance with an additives recipe 3 shown below for the comparative example 12.

TABLE 3-1

| Modified resin | Raw material resin | | | Raw material resin | | | | Maleic anhydride (MAH) content (parts by mass) | Organic peroxide content (parts by mass) | Adhesive resin composition | | |
|---|---|---|---|---|---|---|---|---|---|---|---|---|
| | type (1) | density (g/cm³) | MFR (g/10 min) | content (% by mass) | type (2) | density (g/cm³) | MFR (g/10 min) | content (% by mass) | | | Grafted MAH content (% by mass) | MFR (g/10 min) | Ring opening ratio (%) |
| 1 | HDPE1 | 0.956 | 0.80 | 100 | — | — | — | — | 0.375 | 0.015 | 0.30 | 0.30 | 1 |
| 2 | LLDPE1 | 0.928 | 0.80 | 100 | — | — | — | — | 0.375 | 0.015 | 0.30 | 0.28 | 2 |
| 3 | LLDPE2 | 0.923 | 2.0 | 100 | — | — | — | — | 0.375 | 0.015 | 0.30 | 0.28 | 5 |
| 4 | HDPE1 | 0.956 | 0.80 | 100 | — | — | — | — | 0.60 | 0.015 | 0.43 | 0.20 | 2 |
| 5 | LLDPE1 | 0.928 | 0.80 | 100 | — | — | — | — | 0.60 | 0.015 | 0.43 | 0.20 | 3 |
| 6 | LLDPE3 | 0.923 | 0.80 | 100 | — | — | — | — | 0.60 | 0.015 | 0.45 | 0.18 | 3 |
| 7 | HDPE2 | 0.952 | 0.80 | 85 | LLDPE1 | 0.928 | 0.80 | 15 | 0.375 | 0.015 | 0.30 | 0.30 | 3 |
| 8 | HDPE2 | 0.952 | 0.80 | 56 | LLDPE1 | 0.928 | 0.80 | 44 | 0.60 | 0.015 | 0.43 | 0.21 | 1 |
| 9 | HDPE2 | 0.952 | 0.80 | 44 | LLDPE1 | 0.928 | 0.80 | 56 | 0.60 | 0.015 | 0.43 | 0.19 | 3 |
| 10 | LLDPE4 | 0.930 | 4.0 | 100 | — | — | — | — | 0.60 | 0.015 | 0.45 | 2.0 | 3 |
| 11 | LLDPE5 | 0.923 | 8.0 | 100 | — | — | — | — | 0.60 | 0.015 | 0.45 | 3.2 | 3 |
| 12 | HDPE1 | 0.956 | 0.80 | 85 | LLDPE1 | 0.928 | 0.80 | 15 | 0.375 | 0.015 | 0.30 | 0.30 | 2 |
| 13 | HDPE1 | 0.956 | 0.80 | 56 | LLDPE1 | 0.928 | 0.80 | 44 | 0.375 | 0.015 | 0.30 | 0.25 | 3 |
| 14 | HDPE1 | 0.956 | 0.80 | 67 | LLDPE1 | 0.928 | 0.80 | 33 | 0.375 | 0.015 | 0.30 | 0.27 | 2 |
| 15 | HDPE1 | 0.956 | 0.80 | 15 | LLDPE1 | 0.928 | 0.80 | 85 | 0.375 | 0.015 | 0.31 | 0.23 | 2 |

TABLE 3-2

| Modified resin | Raw material resin | | | | Raw material resin | | | | Maleic anhydride (MAH) content (parts by mass) | Organic peroxide content (parts by mass) | Adhesive resin composition | | |
|---|---|---|---|---|---|---|---|---|---|---|---|---|---|
| | type (1) | density (g/cm³) | MFR (g/10 min) | content (% by mass) | type (2) | density (g/cm³) | MFR (g/10 min) | content (% by mass) | | | Grafted MAH content (% by mass) | MFR (g/10 min) | Ring opening ratio (%) |
| 16 | HDPE1 | 0.956 | 0.80 | 100 | — | — | — | — | 0.375 | 0.015 | 0.29 | 0.33 | 2 |
| 17 | LLDPE1 | 0.928 | 0.80 | 100 | — | — | — | — | 0.375 | 0.015 | 0.32 | 0.20 | 1 |
| 18 | HDPE2 | 0.951 | 0.73 | 100 | — | — | — | — | 0.375 | 0.015 | 0.29 | 0.32 | 3 |
| 19 | LLDPE6 | 0.927 | 0.90 | 100 | — | — | — | — | 0.370 | 0.010 | 0.28 | 0.40 | 3 |
| 20 | HDPE2 | 0.952 | 0.80 | 85 | LLDPE1 | 0.928 | 0.80 | 15 | 0.375 | 0.015 | 0.30 | 0.30 | 30 |
| 21 | HDPE1 | 0.956 | 0.80 | 85 | LLDPE1 | 0.928 | 0.80 | 15 | 0.375 | 0.015 | 0.30 | 0.30 | 29 |

TABLE 4-1

|  | Example 1 | Example 2 | Example 3 | Example 4 | Example 5 | Example 6 | Example 7 |
|---|---|---|---|---|---|---|---|
| Modified resin 1 | 41 | | | | | | |
| Modified resin 2 | | | | | 41 | | |
| Modified resin 3 | | | | | | 41 | |
| Modified resin 5 | | | | | | | |
| Modified resin 6 | | | | | | | |
| Modified resin 7 | | 41 | 41 | 41 | | | |
| Modified resin 8 | | | | | | | 30 |
| Modified resin 9 | | | | | | | |
| HDPE1 0.956/0.80 | | | 5 | | 5 | 15 | |
| LLDPE2 0.923/2.00 | | | | | | | |
| LLDPE3 0.923/0.80 | 59 | 59 | 54 | | 54 | 44 | 70 |
| LLDPE5 0.923/8.00 | | | | 59 | | | |
| Additives recipe | recipe 1 | recipe 1 | recipe 1 | recipe 1 | recipe 1 | recipe 1 | recipe 1 |
| MFR (g/10 minutes) | 0.5 | 0.5 | 0.5 | 0.6 | 0.5 | 0.5 | 0.5 |
| MAH content (% by mass) | 0.12 | 0.12 | 0.12 | 0.12 | 0.12 | 0.12 | 0.13 |
| MAH ring opening ratio (%) | 1.0 | 1.0 | 1.0 | 1.0 | 1.0 | 3.0 | 1.0 |
| Density (g/cm$^3$) | 0.937 | 0.935 | 0.937 | 0.931 | 0.927 | 0.928 | 0.929 |
| MFR A/B ratio | 0.38 | 0.38 | 0.38 | 0.38 | 0.31 | 0.31 | 0.26 |
| Moldability | ○ | ○ | ○ | ○ | ○ | ○ | ○ |
| Tensile impact strength of a nominal regrind composition at −40° C. (KJ/m$^2$) | 128 | 127 | 128 | 128 | 127 | 128 | 128 |
| Charpy impact strength of a 4 type 6 layer vessel at −40° C. (KJ/m$^2$) | | 5.3 | | | | 1.2 | |
| Degree of fuel oil swelling (% by mass) | 17 | 18 | 17 | 22 | 28 | 26 | 25 |
| Initial adhesive strength (MPa) | 16 | 16 | 16 | 16 | 15 | 16 | 15 |
| Adhesive strength following soak in fuel oil (MPa) | 14 | 14 | 15 | 14 | 13 | 15 | 14 |
| Measurement and observation of transmission electron microscope photograph | ○ | — | ○ | — | — | ○ | ○ |

TABLE 4-2

|  | Example 8 | Example 9 | Example 10 | Example 11 | Example 12 | Example 13 |
|---|---|---|---|---|---|---|
| Modified resin 1 | | | | | | |
| Modified resin 2 | | | | | | |
| Modified resin 3 | | | | | | |
| Modified resin 5 | | | | | 30 | |
| Modified resin 6 | | | | | | 30 |
| Modified resin 7 | | | | | | |
| Modified resin 8 | 30 | 30 | 30 | | | |
| Modified resin 9 | | | | 30 | | |
| HDPE1 0.956/0.80 | 10 | | 10 | 10 | | 10 |
| LLDPE2 0.923/2.00 | | 70 | | | | |
| LLDPE3 0.923/0.80 | 60 | | | | 70 | 60 |
| LLDPE5 0.923/8.00 | | | 60 | 60 | | |
| Additives recipe | recipe 1 | recipe 1 | recipe 1 | recipe 1 | recipe 1 | recipe 1 |
| MFR (g/10 minutes) | 0.5 | 0.7 | 0.5 | 0.5 | 0.5 | 0.6 |
| MAH content (% by mass) | 0.13 | 0.13 | 0.13 | 0.13 | 0.13 | 0.13 |
| MAH ring opening ratio (%) | 1.0 | 1.0 | 1.0 | 1.0 | 1.0 | 1.0 |
| Density (g/cm$^3$) | 0.933 | 0.929 | 0.928 | 0.927 | 0.925 | 0.925 |
| MFR A/B ratio | 0.26 | 0.11 | 0.26 | 0.24 | 0.25 | 0.23 |
| Moldability | ○ | ○ | ○ | ○ | ○ | ○ |
| Tensile impact strength of a nominal regrind composition at −40° C. (KJ/m$^2$) | 129 | 130 | 130 | 130 | 131 | 130 |
| Charpy impact strength of a 4 type 6 layer vessel at −40° C. (KJ/m$^2$) | | | 5.4 | | | |
| Degree of fuel oil swelling (% by mass) | 20 | 25 | 26 | 28 | 30 | 29 |
| Initial adhesive strength (MPa) | 15 | 15 | 15 | 15 | 15 | 15 |
| Adhesive strength following soak in fuel oil (MPa) | 14 | 13 | 13 | 14 | 13 | 14 |
| Measurement and observation of transmission electron microscope photograph | — | — | — | — | — | — |

TABLE 5-1

|  | Co. Ex. 1 | Co. Ex. 2 | Co. Ex. 3 | Co. Ex. 4 | Co. Ex. 5 | Co. Ex. 6 |
|---|---|---|---|---|---|---|
| Modified resin 1 | 17 | 24 |  |  | 35 | 35 |
| Modified resin 2 | 3 | 3 |  |  | 6 | 6 |
| Modified resin 4 |  |  |  |  |  |  |
| Modified resin 5 |  |  |  |  |  |  |
| Modified resin 7 |  |  |  |  |  |  |
| Modified resin 10 |  |  | 30 |  |  |  |
| Modified resin 11 |  |  |  | 30 |  |  |
| HDPE1 0.956/0.80 |  |  | 10 | 10 |  |  |
| LLDPE1 0.928/0.80 |  | 13 |  |  |  | 10 |
| LLDPE2 0.923/2.00 |  |  |  |  |  |  |
| LLDPE3 0.923/0.80 | 80 | 60 | 60 | 60 |  |  |
| LLDPE4 0.930/4.00 |  |  |  |  | 59 | 49 |
| LLDPE5 0.923/8.00 |  |  |  |  |  |  |
| sVLDPE 0.902/1.00 |  |  |  |  |  |  |
| Additives recipe | recipe 1 | recipe 1 | recipe 1 | recipe 1 | recipe 1 | recipe 1 |
| MFR (g/10 minutes) | 0.5 | 0.5 | 0.5 | 0.5 | 4.2 | 3.0 |
| MAH content (% by mass) | 0.06 | 0.08 | 0.13 | 0.13 | 0.12 | 0.12 |
| MAH ring opening ratio (%) | 1.0 | 1.0 | 1.0 | 1.0 | 1.0 | 1.0 |
| Density (g/cm$^3$) | 0.929 | 0.932 | 0.928 | 0.926 | 0.934 | 0.934 |
| MFR A/B ratio | 0.36 | 0.36 | 2.5 | 4.0 | 0.01 | 0.02 |
| Moldability | ○ | ○ | ○ | ○ | X | X |
| Tensile impact strength of a nominal regrind composition at −40° C. (KJ/m$^2$) | 90 | 105 | 130 | 131 | 128 | 128 |
| Charpy impact strength of a 4 type 6 layer vessel at −40° C. (KJ/m$^2$) | 3.6 | 4.2 |  |  |  |  |
| Degree of fuel oil swelling (% by mass) | 25 | 21 | 26 | 29 | 19 | 19 |
| Initial adhesive strength (MPa) | 13 | 14 | 8 | 8 | 13 | 13 |
| Adhesive strength following soak in fuel oil (MPa) | 12 | 13 | 6 | 6 | 12 | 11 |
| Measurement/observation of transmission electron microscope photograph | — | — | — | — | — | — |

TABLE 5-2

|  | Co. Ex. 7 | Co. Ex. 8 | Co. Ex. 9 | Co. Ex. 10 | Co. Ex. 11 | Co. Ex. 12 |
|---|---|---|---|---|---|---|
| Modified resin 1 |  | 6 | 60 | 60 | 41 | 41 |
| Modified resin 2 |  | 35 | 11 | 11 |  |  |
| Modified resin 4 | 13 |  |  |  |  |  |
| Modified resin 5 | 17 |  |  |  |  |  |
| Modified resin 7 |  |  |  |  |  |  |
| Modified resin 10 |  |  |  |  |  |  |
| Modified resin 11 |  |  |  |  |  |  |
| HDPE1 0.956/0.80 |  |  |  |  |  |  |
| LLDPE1 0.928/0.80 |  |  |  | 29 |  |  |
| LLDPE2 0.923/2.00 |  |  | 29 |  |  |  |
| LLDPE3 0.923/0.80 |  |  |  |  | 59 | 59 |
| LLDPE4 0.930/4.00 |  |  |  |  |  |  |
| LLDPE5 0.923/8.00 | 70 | 59 |  |  |  |  |
| sVLDPE 0.902/1.00 |  |  |  |  |  |  |
| Additives recipe | recipe 1 | recipe 1 | recipe 1 | recipe 1 | recipe 2 | recipe 3 |
| MFR (g/10 minutes) | 0.6 | 0.6 | 0.6 | 0.6 | 0.5 | 0.4 |
| MAH content (% by mass) | 0.13 | 0.12 | 0.21 | 0.21 | 0.11 | 0.11 |
| MAH ring opening ratio (%) | 1.0 | 1.0 | 1.0 | 1.0 | 1.0 | 1.0 |
| Density (g/cm$^3$) | 0.923 | 0.923 | 0.943 | 0.945 | 0.937 | 0.937 |
| MFR A/B ratio | 0.25 | 0.38 | 0.15 | 0.38 | 0.38 | 0.38 |
| Moldability | ○ | ○ | ○ | ○ | ○ | ○ |
| Tensile impact strength of a nominal regrind composition at −40° C. (KJ/m$^2$) | 129 | 127 | 140 | 140 | 128 | 128 |
| Charpy impact strength of a 4 type 6 layer vessel at −40° C. (KJ/m$^2$) |  |  |  |  |  |  |
| Degree of fuel oil swelling (% by mass) | 34 | 34 | 13 | 13 | 17 | 17 |
| Initial adhesive strength (MPa) | 14 | 14 | 10 | 10 | 12 | 10 |
| Adhesive strength following soak in fuel oil (MPa) | 12 | 12 | 8 | 8 | 10 | 7 |

TABLE 5-2-continued

| | Co. Ex. 7 | Co. Ex. 8 | Co. Ex. 9 | Co. Ex. 10 | Co. Ex. 11 | Co. Ex. 12 |
|---|---|---|---|---|---|---|
| Measurement/observation of transmission electron microscope photograph | — | — | — | X | X | — |

TABLE 6

| Additive Type | Brand | Additives recipe 1 | Additives recipe 2 | Additives recipe 3 |
|---|---|---|---|---|
| Phenol based antioxidant | Irganox 1330 (Ciba Specialty Chemicals Ltd.) | 0.15 | 0.15 | 0.15 |
| | Irganox 1076 (Ciba Specialty Chemicals Ltd.) | 0.05 | 0.05 | 0.05 |
| Phosphoric acid based antioxidant | Irgafos 168 (Ciba Specialty Chemicals Co., Ltd.) | 0.10 | 0.10 | 0.10 |
| Acid absorber | Hydrotalcite DHT4A (Kyowa Chemical Industry Co., Ltd.) | 0.05 | — | — |
| | Calcium stearate (NOF Corporation) | — | 0.03 | 0.10 |

Units: parts by mass

[Formation of a 3 Type 5 Layer Tank]

First, parison was formed from the adhesive resin composition. Then, using a 3 type 5 layer small multi-layer blow molding machine at a molding temperature of 210° C., this parison was used to form a 3 type 5 layer laminated vessel with a total thickness of 6 mm, an internal capacity of 10 L, and a layer configuration comprising a high density polyethylene (HDPE) layer (principal material layer)/an adhesive resin composition layer (adhesive layer)/a saponified product of an ethylene-vinyl acetate copolymer (barrier layer)/an adhesive resin composition layer (adhesive layer)/ and a high density polyethylene layer (principal material layer) formed in a ratio of 45.5/3/3/3/45.5 respectively.

In this process, the high density polyethylene utilized a product KBY47C manufactured by Japan Polyolefins Co. Ltd. with a density of 0.947 g/cm$^3$ and a 190° C. MFR at a loading of 21.6 kg of 6 g/10 minutes, whereas the saponified product of an ethylene-vinyl acetate copolymer used a product EVAL F101B manufactured by Kuraray Co., (Ltd.).

[Moldability Evaluation]

The moldability evaluations were performed by slicing samples out of the intermediate region of the parison used in the formation of the 3 type 5 layer laminated tank, and then visually inspecting the samples for irregularities in the lamination of the adhesive layer/barrier layer/adhesive layer. 5 parison samples were inspected, and if an irregularity was observed in even one sample, the evaluation result was recorded as X. These evaluation results are shown in Table 4 to Table 5.

[Initial Adhesive Strength]

The initial adhesive strength was measured by cutting a 10 mm wide sample in the MD direction from the flat section in the base of the 3 type 5 layer vessel, and then measuring the adhesive strength between the outermost adhesive layer and the barrier layer using a T-peel method. This measurement was performed twice and the average value was recorded. The results are shown in Table 4 to Table 5.

[Adhesive Strength Following Soak in Fuel Oil]

The adhesive strength following soak in fuel oil was measured in a similar manner to the initial adhesive strength evaluation, by cutting a strip sample of width 10 mm and length 150 mm in the MD direction from the flat section in the base of the 3 type 5 layer vessel, soaking the sample in commercially available regular gasoline at 65° C. for a period of 2,000 hours, and then measuring the adhesive strength between the outermost adhesive layer and the barrier layer using a T-peel method. This measurement was performed twice and the average value was recorded. The results are shown in Table 4 to Table 5.

[Degree of Fuel Oil Swelling]

Fuel oil swelling was determined by cutting a 80 mm×10 mm sample from a pressed sheet of thickness 4 mm, soaking the sample in commercially available regular gasoline at 65° C. for a period of 2,000 hours, and then measuring the weight increase from the weight prior to soak, thereby determining a weight proportion due to fuel oil swelling. This measurement was performed twice and the average value was recorded. The results are shown in Table 4 to Table 5.

[Measurement of Maleic Anhydride Quantity]

The content of added maleic anhydride (MAH) (the degree of maleination) was determined by using infrared absorption spectroscopy to measure the absorption of A1: 1,790 cm$^{-1}$ anhydride group (C=O), A2: 1,710 to 1,720 cm$^{-1}$ carboxylic acid group (C=O), and A3: 4,250 cm$^{-1}$ methylene group (—CH$_2$—), and then calculating the following content:

MAH content=A1 (anhydride group) absorption+A2 (carboxylic acid group) absorption/A3 (methylene group) absorption×0.265 (% by mass)

[Maleic Anhydride Ring Group Opening Ratio]

Using infrared absorption spectroscopy, the absorption was measured for A1: 1,790 cm$^{-1}$ anhydride group (C=O), and A2: 1,710 to 1,720 cm$^{-1}$ carboxylic acid group (C=O), and the maleic anhydride group ring opening ratio was then determined in the following manner:

Ring opening ratio=(A2: carboxylic acid group absorption/A1: anhydride group absorption+A2: carboxylic acid group absorption)×100 (% by mass)

[Nominal Regrind Layer Composition]

A mixture of 6.7% by mass of an adhesive resin composition from examples 1 to 13 and comparative examples 1 to 12, 88.3% by mass of a high density polyethylene (KBY47C, manufactured by Japan Polyolefins Co. Ltd.) with a density of 0.945 g/cm$^3$ and a MFR at temperature 190° C. and loading 21.6 kg of 6 g/10 minutes, and 5% by mass of a saponified product of an ethylene-vinyl acetate copolymer (EVAL F101B, manufactured by Kuraray Co., Ltd.) was subjected to molten kneading under the conditions shown below.

Extruder: Modern Machinery (Ltd.), 50 mm single screw extruder,

Screw revolutions: 60 rpm,

Temperature: cylinder 1-cylinder 2-cylinder 3-H-dice temperature settings of 180° C.-200° C.-200° C.-200° C.-200° C.

[Sheet Molding Conditions]

A sheet of thickness 4 mm was prepared in a press molding device using a temperature setting of 200° C., a press pressure of 6 MPa, a preheating period of 7 minutes, a press time of 5 minutes, and a cooling period of 10 minutes, and a test specimen of a shape 1 according to JIS K7160 was then punched out of this sheet.

[WV Notch Tensile Impact Strength]

Subsequently, the above test specimen was used to measure the WV notch tensile impact strength at −40° C. (JIS K7160 (ISO8256)). The measurement was performed with n=5, and the average of these results was recorded. The results are shown in Table 4 to Table 5.

[Formation of a 4 Type 6 Layer Tank with a Regrind Layer]

A 4 type 6 layer vessel with a total thickness of 4 to 7 mm, an internal capacity of 70 L, and a layer configuration comprising an outer layer/regrind layer/outer adhesive layer/barrier layer/inner adhesive layer/and an inner layer was formed in a ratio of 15/45/2/3/2/33 respectively. In this process, the outer layer and the inner layer utilized a high density polyethylene (brand: KBY47C manufactured by Japan Polyolefins Co. Ltd.) with a density of 0.945 g/cm$^3$ and a MFR at a temperature 190° C. and a loading 21.6 kg of 6 g/10 minutes, whereas the barrier layer used a saponified product of an ethylene-vinyl acetate copolymer (brand: EVAL F101B manufactured by Kuraray Co., (Ltd.)).

Observation of this multi-layer blow molding revealed that the time taken from when the adhesive resin layer and the barrier layer came into molten state contact inside the die, until air was blown into the parison and the swelling parison contacted the blow mold and began to cool was approximately 30 seconds.

[Evaluation of Low Temperature Impact Resistance Strength]

A sample was cut from the flat section in the base of the regrind layer containing 4 type 6 layer vessel formed in the manner described above, and this sample was evaluated in accordance with JIS K7111, by measuring the −40° C. Charpy impact strength (KJ/m2) for a notched test specimen. The results are shown in Table 4 to Table 5.

[Measurement of Transmission Electron Microscope Photographs]

While freezing the interface of a laminate (adhesive resin composition/EVOH) with liquid N$_2$ gas, a mirror surface was formed, this mirror surface was dyed with an osmium tetroxide solution, and following washing and subsequent dyeing with ruthenium tetroxide, the interface was used to prepare a 70 to 80 nm section using an ultramicrotome, and this section was then observed under a transmission electron microscope at a magnification of 20,000× to 50,000×.

O: Irregularities with an elevation difference of at least 100 nm were visible

X: Irregularities with an elevation difference of at least 100 nm were not visible

[Evaluation Results]

3 type 5 layer vessels were prepared using the compositions shown in the examples 1 to 13 and the comparative examples 1 to 12 as the adhesive layer, and the moldability, the initial adhesive strength, the adhesive strength following soak in fuel oil, the degree of fuel oil swelling, and the WV notch tensile impact strength at −40° C. of a nominal regrind composition was evaluated for each vessel, and then for representative examples, the low temperature impact resistance of a 4 type 6 layer vessel was also measured. The results of these evaluations shown in Table 4 to Table 5 reveal that the examples 1 to 13 satisfy the conditions of the present invention, and consequently showed good results for all of the evaluations.

In contrast, the comparative example 1 and the comparative example 2, for which the maleic anhydride content in the final adhesive resin composition was low, displayed an inferior low temperature impact resistance of the vessel with a regrind layer, as well as an inferior low temperature impact resistance of the associated 4 type 6 layer laminated vessel.

Furthermore, the comparative example 3 and the comparative example 4, for which the melt flow rate of the modified raw material resin was outside the range specified by the present invention (MFR=4.0 for the comparative example 3, and MFR 8.0 for the comparative example 4), and moreover for which the ratio between the melt flow rates at a temperature of 190° C. and a loading of 2.16 kg for the modified polyethylene (A) and the unmodified polyethylene (B) was greater than 1, displayed a lower adhesive strength.

Furthermore, the comparative example 5 and the comparative example 6, for which the MFR of the final adhesive resin composition was a high value outside the range specified by the present invention, displayed inferior moldability.

Furthermore, the comparative example 7 and the comparative example 8, for which the density of the final adhesive resin composition was a low value outside the range specified by the present invention, displayed a large degree of fuel oil swelling.

The comparative example 9 and the comparative example 10, for which the density of the final adhesive resin composition was very high, displayed an inferior adhesive strength.

In addition, the comparative example 11 and the comparative example 12, which used calcium stearate as an acid absorber, displayed an inferior adhesive strength.

Examples 14 to 33

The modified polyethylenes (modified resin 12 to modified resin 21 described below) were produced in the following manner.

(Modified Resin 12)

To a high density polyethylene (HDPE1) with a density of 0.956 g/cm$^3$ and a MFR of 0.80 g/10 minutes produced using a Ziegler catalyst, or alternatively to a mixture of this polyethylene with a linear low density polyethylene, 0.015 parts of 2,5-dimethyl-2,5-t-butylperoxyhexane was added, and the mixture was then dry blended for one minute in a Henschel mixer. Subsequently, 0.375 parts of maleic anhydride was added, and following a further 2 minutes of dry blending, the mixture was subjected to molten kneading at a temperature of 260° C. using a 50 mm single screw extruder manufactured by Modern Machinery (Ltd.), yielding the modified resin. The content of grafted maleic anhydride (MAH content) and the like are shown in Table 3.

(Modified Resin 13)

Production was performed under identical conditions to the modified resin 12, but with two different types of raw material polyethylene pre-blended in the composition shown in Table 3. The density and MFR of the original polyethylenes, and the content of grafted maleic anhydride are summarized in Table 3.

(Modified Resin 14 to Modified Resin 17)

Production was performed under identical conditions to the modified resin 13, using a linear low density polyethylene (LLDPE1) with a density of 0.928 g/cm$^3$ and a MFR of 0.80 g/10 minutes produced using a Ziegler catalyst. 0.015 parts of 2,5-dimethyl-2,5-t-butylperoxyhexane were added, and the mixture was dry blended for one minute in a Henschel mixer, and the content of subsequently grafted maleic anhydride was 0.32% by mass (refer to Table 3).

(Modified Resin 18)

To a high density polyethylene (HDPE2) with a density of 0.951 g/cm$^3$ and a MFR of 0.73 g/10 minutes produced using a Ziegler catalyst, 0.012 parts of 2,5-dimethyl-2,5-t-butylperoxyhexane was added, and the mixture was then dry blended for one minute in a Henschel mixer. Subsequently, 0.375 parts of maleic anhydride was added, and following a further 2 minutes of dry blending, the mixture was subjected to molten kneading at a temperature of 260° C. using a 50 mm single screw extruder manufactured by Modern Machinery (Ltd.), yielding the modified resin. The content of grafted maleic anhydride was 0.29% by mass (refer to Table 3).

(Modified Resin 19)

To a linear low density polyethylene (LLDPE2) with a density of 0.927 g/cm$^3$ and a MFR of 0.9 g/10 minutes produced using a Ziegler catalyst, 0.01 parts of 2,5-dimethyl-2,5-t-butylperoxyhexane was added, and the mixture was then dry blended for one minute in a Henschel mixer. Subsequently, 0.375 parts of maleic anhydride was added, and following a further 2 minutes of dry blending, the mixture was subjected to molten kneading at a temperature of 260° C. using a 50 mm single screw extruder manufactured by Modern Machinery (Ltd.), yielding the modified resin. The content of grafted maleic anhydride was 0.28% by mass (refer to Table 3).

(Modified Resin 20)

To a mixture of 85% by mass of a high density polyethylene (HDPE2) with a density of 0.952 g/cm$^3$ and a MFR of 0.80 g/10 minutes, and 15% by mass of a linear low density polyethylene (LLDPE1) with a density of 0.928 g/cm$^3$ and a MFR of 0.80 g/10 minutes, 0.015 parts of 2,5-dimethyl-2,5-t-butylperoxyhexane was added, and the mixture was then dry blended for one minute in a Henschel mixer. Subsequently, 0.375 parts of maleic anhydride was added, and following a further 2 minutes of dry blending, the mixture was subjected to molten kneading at 290° C. using a 50 mm single screw extruder manufactured by Modern Machinery (Ltd.), yielding a modified polyethylene (the modified resin 20). The content of grafted maleic anhydride in this modified polyethylene was 0.30% by mass.

This modified resin 20 was left sitting in the open air at room temperature for 3 months, and the ring opening ratio of the maleic anhydride was then measured. Furthermore, the density and MFR of the original polyethylenes, and the content of grafted maleic anhydride are shown in Table 3.

(Modified Resin 21)

To a mixture of 85% by mass of a high density polyethylene (HDPE1) with a density of 0.956 g/cm$^3$ and a MFR of 0.80 g/10 minutes, and 15% by mass of a linear low density polyethylene (LLDPE1) with a density of 0.928 g/cm$^3$ and a MFR of 0.80 g/10 minutes, was added 0.015 parts of 2,5-dimethyl-2,5-t-butylperoxyhexane, and the mixture was then dry blended for one minute in a Henschel mixer. Subsequently, 0.375 parts of maleic anhydride was added, and following a further 2 minutes of dry blending, the mixture was subjected to molten kneading at 290° C. using a 50 mm single screw extruder manufactured by Modem Machinery (Ltd.), yielding a modified polyethylene (the modified resin 21). The content of grafted maleic anhydride in this modified polyethylene was 0.30% by mass.

This modified resin 21 was left sitting in the open air at room temperature for 3 months, and the ring opening ratio of the maleic anhydride was then measured. Furthermore, the density and MFR of the original polyethylenes, and the content of grafted maleic anhydride are shown in Table 3.

Examples 14 to 21

To a composition produced by combining the modified resins shown in Table 7 with an ultra low density polyethylene (sVLDPE) produced using a single site catalyst, which represents an ethylene copolymer (A1), were added antioxidants and an acid absorber (recipe 1), and the mixture was then subjected to molten kneading at a temperature of 220° C. using a 50 mm single screw extruder manufactured by Modern Machinery (Ltd.), yielding an adhesive resin composition. A 3 type 5 layer vessel was produced using the adhesive resin composition, and the moldability, the initial adhesive strength, the adhesive strength following soak in fuel oil, and the degree of fuel oil swelling were measured and evaluated. The results are shown in Table 7.

Examples 22 to 29

The results of evaluations for adhesive resin compositions in which the ethylene copolymer (A1) was replaced with an ultra low density polyethylene (mVLDPE) produced using a metallocene catalyst are also shown in Table 7.

Example 30

The results of evaluations for an adhesive resin composition in which the ethylene copolymer (A1) was replaced with a linear low density polyethylene (sLLDPE) produced using a single site catalyst, which represents an ethylene copolymer (A2), and a Ziegler based ultra low density polyethylene (zVLDPE) are also shown in Table 7.

Examples 31 to 32

The results of evaluations for adhesive resin compositions using the modified resins 20, 21, for which the ring opening ratio of the maleic anhydride group is high, are also shown in Table 7.

Example 33

The results of evaluations for an adhesive resin composition prepared in the same manner as the example 15, with the exception of replacing the single site ultra low density polyethylene (sVLDPE) of the example 15 with a Ziegler based ultra low density polyethylene, are also shown in Table 7.

Comparative Examples 13 to 17

The modified resins and other used resins shown in Table 8 were combined, and 3 type 5 layer vessels were produced using the compositions shown in the comparative examples 13 to 17 as the adhesive layer. The moldability, the initial adhesive strength, the adhesive strength following soak in fuel oil, and the degree of fuel oil swelling were measured for each vessel, and the results of the evaluations are shown in Table 8.

[Evaluation Results]

The examples 14 to 33, which correspond with the present invention, displayed good values for all the evaluations. In contrast, the comparative example 13, for which the content of unsaturated carboxylic acid and derivatives thereof in the final composition was low, displayed an inferior adhesive strength and a poor low temperature impact strength for the nominal regrind composition, whereas the comparative examples 14 to 16, displayed a large degree of fuel swelling. The comparative example 17 displayed a MFR value outside the range specified by the present invention, and the moldability was poor.

TABLE 7-1

|  | Example 14 | Example 15 | Example 16 | Example 17 | Example 18 | Example 19 | Example 20 |
|---|---|---|---|---|---|---|---|
| Modified resin 12 |  | 41 |  |  | 41 | 41 | 41 |
| Modified resin 13 |  |  |  | 41 |  |  |  |
| Modified resin 14 |  |  |  |  |  |  |  |
| Modified resin 15 |  |  |  |  |  |  |  |
| Modified resin 16 | 41 |  |  |  |  |  |  |
| Modified resin 17 |  |  | 41 |  |  |  |  |
| Modified resin 19 |  |  |  |  |  |  |  |
| Modified resin 20 |  |  |  |  |  |  |  |
| Modified resin 21 |  |  |  |  |  |  |  |
| HDPE1 0.956/0.80 | 5 | 5 | 15 | 5 |  |  |  |
| HDPE2 0.951/0.73 |  |  |  |  | 1 | 1 | 1 |
| LLDPE1 0.928/0.80 | 29 | 29 | 19 | 29 | 33 |  | 33 |
| LLDPE3 0.923/0.80 |  |  |  |  |  | 33 | 10 |
| sLLDPE (A2) 0.930/1.00 |  |  |  |  |  |  |  |
| zVLDPE 0.904/0.89 |  |  |  |  |  |  |  |
| sVLDPE (A1) 0.906/1.10 | 25 | 25 | 25 | 25 | 25 | 25 | 15 |
| mVLDPE 0.908/1.00 |  |  |  |  |  |  |  |
| Additives recipe | recipe 1 | recipe 1 | recipe 1 | recipe 1 | recipe 1 | recipe 1 | recipe 1 |
| MFR (g/10 minutes) | 0.5 | 0.5 | 0.6 | 0.5 | 0.5 | 0.5 | 0.5 |
| MAH content (% by mass) | 0.12 | 0.12 | 0.13 | 0.12 | 0.12 | 0.12 | 0.12 |
| MAH ring opening ratio (%) | 1 | 1 | 1 | 1 | 1 | 1 | 1 |
| Density (g/cm$^3$) | 0.935 | 0.934 | 0.927 | 0.930 | 0.933 | 0.931 | 0.934 |
| MFR A/B ratio | 0.34 | 0.31 | 0.21 | 0.26 | 0.33 | 0.33 | 0.34 |
| Moldability | ○ | ○ | ○ | ○ | ○ | ○ | ○ |
| Tensile impact strength of a nominal regrind composition at −40° C. (KJ/m$^2$) | 127 | 128 | 129 | 128 | 128 | 129 | 128 |
| Charpy impact strength of a 4 type 6 layer vessel at −40° C. (KJ/m$^2$) |  | 5.3 |  |  |  |  | 5.2 |
| Degree of fuel oil swelling (% by mass) | 18 | 19 | 28 | 23 | 21 | 22 | 19 |
| Initial adhesive strength (MPa) | 15 | 16 | 17 | 16 | 16 | 15 | 16 |
| Adhesive strength following soak in fuel oil (MPa) | 13 | 14 | 16 | 15 | 13 | 13 | 14 |
| Observation of transmission electron microscope photograph | ○ | — | — | — | — | — | — |

TABLE 7-2

|  | Example 21 | Example 22 | Example 23 | Example 24 | Example 25 | Example 26 | Example 27 |
|---|---|---|---|---|---|---|---|
| Modified resin 12 | 41 | 41 |  |  |  | 41 | 41 |
| Modified resin 13 |  |  |  |  | 41 |  |  |
| Modified resin 14 |  |  |  |  |  |  |  |
| Modified resin 15 |  |  |  |  |  |  |  |
| Modified resin 16 |  |  | 41 |  |  |  |  |
| Modified resin 17 |  |  |  | 41 |  |  |  |
| Modified resin 19 |  |  |  |  |  |  |  |
| Modified resin 20 |  |  |  |  |  |  |  |
| Modified resin 21 |  |  |  |  |  |  |  |
| HDPE1 0.956/0.80 | 5 | 5 | 5 | 15 | 5 |  |  |
| HDPE2 0.951/0.73 |  |  |  |  |  | 1 | 1 |

TABLE 7-2-continued

|  | Example 21 | Example 22 | Example 23 | Example 24 | Example 25 | Example 26 | Example 27 |
|---|---|---|---|---|---|---|---|
| LLDPE1 0.928/0.80 | 24 | 29 | 29 | 19 | 29 | 33 |  |
| LLDPE3 0.923/0.80 |  |  |  |  |  |  | 33 |
| sLLDPE (A2) 0.930/1.00 |  |  |  |  |  |  |  |
| zVLDPE 0.904/0.89 |  |  |  |  |  |  |  |
| sVLDPE (A1) 0.906/1.10 | 30 |  |  |  |  |  |  |
| mVLDPE 0.908/1.00 |  | 25 | 25 | 25 | 25 | 25 | 25 |
| Additives recipe | recipe 1 | recipe 1 | recipe 1 | recipe 1 | recipe 1 | recipe 1 | recipe 1 |
| MFR (g/10 minutes) | 0.7 | 0.5 | 0.5 | 0.6 | 0.5 | 0.5 | 0.5 |
| MAH content (% by mass) | 0.12 | 0.12 | 0.12 | 0.13 | 0.12 | 0.12 | 0.12 |
| MAH ring opening ratio (%) | 1 | 1 | 1 | 1 | 1 | 1 | 1 |
| Density (g/cm$^3$) | 0.933 | 0.934 | 0.936 | 0.927 | 0.931 | 0.933 | 0.931 |
| MFR A/B ratio | 0.33 | 0.33 | 0.35 | 0.22 | 0.26 | 0.36 | 0.36 |
| Moldability | ○ | ○ | ○ | ○ | ○ | ○ | ○ |
| Tensile impact strength of a nominal regrind composition at −40° C. (KJ/m$^2$) | 127 | 128 | 128 | 130 | 128 | 128 | 128 |
| Charpy impact strength of a 4 type 6 layer vessel at −40° C. (KJ/m$^2$) |  |  |  |  |  | 5.3 |  |
| Degree of fuel oil swelling (% by mass) | 20 | 19 | 17 | 28 | 22 | 20 | 22 |
| Initial adhesive strength (MPa) | 15 | 15 | 14 | 16 | 16 | 15 | 15 |
| Adhesive strength following soak in fuel oil (MPa) | 13 | 13 | 13 | 15 | 15 | 13 | 13 |
| Observation of transmission electron microscope photograph | ○ | ○ | — | — | — | — | — |

TABLE 7-3

|  | Example 28 | Example 29 | Example 30 | Example 31 | Example 32 | Example 33 |
|---|---|---|---|---|---|---|
| Modified resin 12 | 41 | 41 | 41 |  |  | 41 |
| Modified resin 13 |  |  |  |  |  |  |
| Modified resin 14 |  |  |  |  |  |  |
| Modified resin 15 |  |  |  |  |  |  |
| Modified resin 16 |  |  |  |  |  |  |
| Modified resin 17 |  |  |  |  |  |  |
| Modified resin 19 |  |  |  |  |  |  |
| Modified resin 20 |  |  |  | 41 |  |  |
| Modified resin 21 |  |  |  |  | 41 |  |
| HDPE1 0.956/0.80 |  | 5 | 5 | 5 | 5 | 5 |
| HDPE2 0.951/0.73 | 1 |  |  |  |  |  |
| LLDPE1 0.928/0.80 | 33 | 24 |  | 29 | 29 | 29 |
| LLDPE3 0.923/0.80 | 10 |  |  |  |  |  |
| sLLDPE (A2) 0.930/1.00 |  |  | 29 |  |  |  |
| zVLDPE 0.904/0.89 |  |  | 25 |  |  | 25 |
| sVLDPE (A1) 0.906/1.10 |  |  |  | 25 |  |  |
| mVLDPE 0.908/1.00 | 15 | 30 |  |  | 25 |  |
| Additives recipe | recipe 1 | recipe 1 | recipe 1 | recipe 1 | recipe 1 | recipe 1 |
| MFR (g/10 minutes) | 0.5 | 0.7 | 0.7 | 0.5 | 0.5 | 0.6 |
| MAH content (% by mass) | 0.12 | 0.12 | 0.12 | 0.12 | 0.12 | 0.12 |
| MAH ring opening ratio (%) | 1 | 1 | 1 | 18 | 17 | 1 |
| Density (g/cm$^3$) | 0.935 | 0.933 | 0.932 | 0.933 | 0.933 | 0.933 |
| MFR A/B ratio | 0.38 | 0.36 | 0.34 | 0.34 | 0.34 | 0.34 |
| Moldability | O | O | O | O | O | O |
| Tensile impact strength of a nominal regrind composition at −40° C. (KJ/m$^2$) | 127 | 128 | 126 | 125 | 126 | 128 |
| Charpy impact strength of a 4 type 6 layer vessel at −40° C. (KJ/m$^2$) |  |  |  |  |  |  |
| Degree of fuel oil swelling (% by mass) | 19 | 20 | 19 | 18 | 18 | 20 |
| Initial adhesive strength (MPa) | 15 | 15 | 17 | 13 | 13 | 12 |
| Adhesive strength following soak in fuel oil (MPa) | 13 | 13 | 16 | 11 | 11 | 10 |
| Observation of transmission electron microscope photograph | O | — | O | — | — | — |

TABLE 8

|  | Comparative Example 13 | Comparative Example 14 | Comparative Example 15 | Comparative Example 16 | Comparative Example 17 |
|---|---|---|---|---|---|
| Modified resin 12 |  |  |  |  | 41 |
| Modified resin 13 |  | 41 |  |  |  |
| Modified resin 14 | 15 |  |  |  |  |
| Modified resin 15 |  |  |  | 41 |  |
| Modified resin 17 |  |  | 41 |  |  |
| Modified resin 18 |  |  |  |  |  |
| Modified resin 19 |  |  |  |  |  |
| Modified resin 21 |  |  |  |  |  |
| HDPE1 0.956/0.80 | 11 |  | 5 | 5 |  |
| HDPE2 0.951/0.73 |  | 1 |  |  |  |
| LLDPE1 0.928/0.80 | 49 |  |  |  |  |
| LLDPE2 0.923/2.00 |  | 19 | 29 | 29 |  |
| LLDPE3 0.923/0.80 |  |  |  |  |  |
| LLDPE7 0.921/30.0 |  |  |  |  | 34 |
| zVLDPE 0.904/0.89 |  | 45 | 25 | 25 |  |
| sVLDPE 0.906/1.00 | 25 |  |  |  | 25 |
| Additives recipe | recipe 1 | recipe 1 | recipe 1 | recipe 1 | recipe 1 |
| MFR (g/10 minutes) | 0.8 | 0.6 | 0.6 | 0.6 | 2.2 |
| MAH content (% by mass) | 0.05 | 0.12 | 0.13 | 0.12 | 0.12 |
| MAH ring opening ratio (%) | 1 | 1 | 1 | 1 | 1 |
| Density (g/cm$^3$) | 0.928 | 0.923 | 0.922 | 0.923 | 0.930 |
| MFR A/B ratio | 0.34 | 0.29 | 0.26 | 0.27 | 0.03 |
| Moldability | O | O | O | O | X |
| Tensile impact strength of a nominal regrind composition at −40° C. (KJ/m$^2$) | 92 | 128 | 130 | 128 | 128 |
| Charpy impact strength of a 4 type 6 layer vessel at −40° C. (KJ/m$^2$) | 3.7 |  |  |  |  |
| Degree of fuel oil swelling (% by mass) | 26 | 33 | 36 | 33 | 23 |
| Initial adhesive strength (MPa) | 8 | 16 | 15 | 15 | 15 |
| Adhesive strength following soak in fuel oil (MPa) | 6 | 14 | 13 | 13 | 13 |
| Observation of transmission electron microscope photograph | X | — | — | X | — |

[Effect of the Ring Opening Ratio of the Maleic Anhydride Group of an Adhesive Resin Composition]

The results of considering the effect of the ring opening ratio of the maleic anhydride group of an adhesive resin composition following modification are shown in Table 9 below.

TABLE 9

| Reference Example | Example | Modified resin type | Ring opening ratio of acid anhydride group (%) | *) Tensile impact strength (KJ/m$^2$) | Degree of fuel oil swelling (% by mass) | Initial adhesive strength (MPa) | Adhesive strength following soak in fuel oil (MPa) |
|---|---|---|---|---|---|---|---|
| 1 | 1 | Modified resin 1 | 1.0 | 128 | 17 | 16 | 14 |
| 2 | 6 | Modified resin 3 | 3.0 | 128 | 26 | 16 | 15 |
| 3 | 31 | modified resin 20 | 18 | 125 | 18 | 13 | 11 |
| 4 | 32 | Modified resin 21 | 17 | 126 | 18 | 13 | 11 |

*) Tensile impact strength at −40° C. of nominal regrind composition

[Evaluation Results]

Although there are no practical problems with the examples 31 and 32, for which the ring opening ratio of the maleic anhydride group of the adhesive resin composition following modification is large, the initial adhesive strength and the adhesive strength following soak in fuel oil tended to be slightly lower.

INDUSTRIAL APPLICABILITY

A characteristic of the present invention is the use of a high molecular weight graft modified polyethylene with a MFR of 0.1 to 2 g/10 minutes, and the use of an adhesive resin composition produced by combining such a modified polyethylene with an unmodified polyethylene of a specific type, and in particular the production of a resin composition in which the MFR ratio of the modified polyethylene and the unmodified polyethylene falls within a specific range.

Furthermore, yet another characteristic of the present invention is the combining of a linear low density polyethylene and an ultra low density polyethylene in an adhesive resin composition.

Furthermore, yet another characteristic of the present invention is the control of the ring opening ratio of the acid anhydride group of an adhesive resin composition following graft modification.

This type of adhesive resin composition of the present invention has excellent moldability, displays excellent adhesion to barrier materials such as saponified products of ethylene-vinyl acetate copolymers or polyamide resins, and moreover is capable of suppressing any deterioration in physical properties when molding by-products such as burrs and unused parison are recycled and reused within the process. Furthermore, products such as laminated vessels and laminated sheets comprising such an adhesive resin composition, and having at least an adhesive layer formed from the adhesive resin composition, a barrier layer formed from a barrier material such as a saponified product of an ethylene-vinyl acetate copolymer or a polyamide resin, a principal material layer formed from a polyethylene based resin, and where necessary a regrind layer formed from recycled burrs or unused parison, display good adhesive strength between each of the layers, and offer excellent low temperature impact resistance for the regrind layer. In particular, the initial adhesive strength and the adhesive strength following soak in fuel oil are high, and the adhesion durability of sections such as pinch off sections generated during rapid deformations during molding (the adhesive strength following soak in fuel oil) is also excellent.

Furthermore, because the degree of fuel oil swelling is low, such vessels are more than capable of enduring extended use with fuel contained therein.

In addition, in a so-called internal recycling process, in which burrs and unused parison generated as by-products during blow molding are ground up and returned to the production process, the low temperature impact resistance of the layer comprising the recycled burrs can be maintained at a high level, and consequently the low temperature impact resistance of the overall vessel is excellent.

Accordingly, a composition of the present invention can be used in a wide variety of applications requiring good adhesive strength, including gasoline tanks for holding fuel oil, and vessels and sheets containing recycled burrs.

The invention claimed is:

1. An adhesive resin composition (III) comprising:
(I) 10 to 90% by mass of a modified polyethylene in which an unsaturated carboxylic acid and/or an unsaturated carboxylic acid derivative unit is grafted to a high molecular weight polyethylene with a melt flow rate (MFR: temperature 190° C., loading 2.16 kg) of 0.1 to 2.0 g/10 minutes, and a density of 0.91 to 0.96 g/cm$^3$, which is at least one of (a) a modified high density polyethylene with a melt flow rate of 0.1 to 2.0 g/10 minutes, and a density of 0.93 to 0.96 g/cm$^3$, and (c) a modified linear low density polyethylene with a melt flow rate of 0.1 to 20 g/10 minutes, and a density of 0.91 or greater and less than 0.93 g/cm$^3$, and
(II) 10 to 90% by mass of an unmodified polyethylene with a melt flow rate (MFR: temperature 190° C., loading 2.16 kg) of 0.1 to 20 g/10 minutes, and a density of 0.86 to 0.96 g/cm$^3$, which is at least one of (b') an unmodified high density polyethylene with a melt flow rate of 0.1 to 20 g/10 minutes, and a density of 0.93 to 0.96 g/cm$^3$, (c') an unmodified linear low density polyethylene with a melt flow rate of 0.1 to 20 g/10 minutes, and a density of 0.91 or greater and less than 0.93 g/cm$^3$, and (d') an unmodified ultra low density polyethylene with a melt flow rate of 0.1 to 20 g/10 minutes, and a density of 0.86 to 0.91 g/cm$^3$, and
wherein a ratio MFR(I)/MFR(II), where MFR(I) represents a melt flow rate (MFR: temperature 190° C., loading 2.16 kg) of said modified polyethylene (I) and MFR(II) represents a melt flow rate (MFR: temperature 190° C., loading 2.16 kg) of said unmodified polyethylene (II), is less than 1,and
wherein at least one of (c) the modified linear low density polyethylene, (c') the unmodified linear low density polyethylene, and (d') the unmodified ultra low density polyethylene is produced using a single site catalyst,
wherein said at least one of (c) a modified linear low density polyethylene, (c') an unmodified linear low density polyethylene, and (d') an unmodified ultra low density polyethylene produced using a single site catalyst is present in said composition, and
wherein a density of said adhesive resin composition (III) is 0.925 to 0.940 g/cm$^3$, a content of said unsaturated carboxylic acid and/or unsaturated carboxylic acid derivative unit incorporated therein is at least 0.09% by mass, and a melt flow rate (MFR: temperature 190° C., loading 2.16 kg) is from 0.1 to 2 g/10 minutes.

2. An adhesive resin composition according to claim 1, wherein said modified polyethylene (I) is a high density polyethylene with a melt flow rate of 0.1 to 2.0 g/10 minutes and a density of 0.93 to 0.96 g/cm$^3$, and said unmodified polyethylene (II) is an unmodified high density polyethylene with a melt flow rate of 0.1 to 20 g/10 minutes and a density of 0.93 to 0.96 g/cm$^3$.

3. An adhesive resin composition according to claim 1, wherein said unmodified linear low density polyethylene (c') and/or said unmodified ultra low density polyethylene (d') are resin compositions comprising an ethylene/α-olefin copolymer (A) which satisfy conditions (1) to (4) shown below:
(1) a density of 0.86 to 0.94 g/cm$^3$,
(2) a melt flow rate of 0.1 to 20 g/10 minutes,
(3) a molecular weight distribution (Mw/Mn) of 1.5 to 4.5, and
(4) a difference between $T_{25}$, representing a temperature at which 25% of a total content is eluted, determined from an integrated elution curve of an elution temperature vs. elution quantity curve obtained by a temperature rising elution fractionation (TREF) method, and $T_{75}$, representing a temperature at which 75% of said total content is eluted, namely $T_{75}-T_{25}$, and a density d which satisfy a relationship of an equation 1, shown below:

$$T_{75}-T_{25} \leq -670 \times d + 644 \qquad \text{(equation 1)}.$$

4. An adhesive resin composition according to claim 3, wherein said ethylene copolymer (A) also satisfies a relationship (5) described below:
(5) a difference between $T_{25}$, representing a temperature at which 25% of a total content is eluted, determined from an integrated elution curve of an elution temperature vs. elution quantity curve obtained by a temperature rising elution fractionation (TREF) method, and $T_{75}$, representing a temperature at which 75% of said total content is eluted, namely $T_{75}-T_{25}$, and a density d which satisfy a relationship of an equation 2, shown below:

$$T_{75}-T_{25}-300\times d+285 \qquad \text{(equation 2)}.$$

5. An adhesive resin composition according to claim 3, wherein said ethylene copolymer (A) is an ethylene copolymer (A1) which satisfies conditions (6) and (7) described below:

(6) a quantity X (% by mass) of an orthodichlorobenzene (ODCB) soluble fraction at 25° C., a density d, and a melt flow rate (MFR) which satisfy relationships of an equation 3 and an equation 4 shown below:

$$X<2.0 \text{ in cases in which } d-0.0081 \text{ logMFR}\geq 0.93 \qquad \text{(equation 3)}$$

$$X<9.8\times 10^3\times(0.9300-d+0.008 \text{ logMFR})^2+2.0 \text{ in cases in which } d-0.008 \text{ logMFR}<0.93, \qquad \text{(equation 4)}$$

and (7) an elution temperature vs. elution quantity curve obtained by a temperature rising elution fractionation (TREF) method which has a plurality of peaks.

6. An adhesive resin composition according to claim 4, wherein said ethylene copolymer (A) is an ethylene copolymer (A2) which also satisfies conditions (8) and (9) described below:

(8) an elution temperature vs. elution quantity curve obtained by a temperature rising elution fractionation (TREF) method which has only one peak, and (9) one, or two or more melting point peaks, wherein a highest melting point Tml and a density d satisfy a relationship of an equation 5, shown below:

$$T\text{ml}\geq 150\times d-19 \qquad \text{(equation 4)}.$$

7. An adhesive resin composition according to claim 6, wherein said ethylene copolymer (A2) also satisfies a condition (10) described below:

(10) a melt tension (MT) and a melt flow rate (MFR) which satisfy an equation 6 shown below:

$$\log MT\leq 0.572\times \log MFR+0.3 \qquad \text{(equation 6)}.$$

8. An adhesive resin composition according to claim 3, wherein a halogen concentration of said ethylene copolymer (A) is no more than 10 ppm.

9. An adhesive resin composition according to claim 3, wherein said resin composition incorporating said ethylene copolymer (A) comprises substantially no additives.

10. An adhesive resin composition according to claim 1, wherein if aliphatic metal salts exist within said adhesive resin composition, a concentration thereof is less than 100 weight ppm.

11. An adhesive resin composition according to claim 1, wherein said unsaturated carboxylic acid is an acid anhydride.

12. An adhesive resin composition according to claim 11, wherein a ring opening ratio of acid anhydride groups of said adhesive resin composition following graft modification is maintained at no more than 10%.

13. An adhesive resin composition according to claim 11, wherein said acid anhydride is maleic anhydride.

14. A multi-layer laminated structure comprising an adhesive layer formed from an adhesive resin composition according to claim 1, and at least a principal material layer formed on an outside of said adhesive layer, and a barrier layer formed on an inside of said adhesive layer.

15. A multi-layer laminated structure according to claim 14, wherein said principal material layer is a high density polyethylene layer and/or a regrind layer using recycled material.

16. A multi-layer laminated structure according to claim 14, formed from a 3 type 5 layer structure comprising a principal material layer formed from a high density polyethylene layer and/or a regrind layer/an adhesive resin composition layer/a barrier layer/an adhesive resin composition layer/and a principal material layer formed from a high density polyethylene layer and/or a regrind layer.

17. A multi-layer laminated structure according to claim 14, wherein a high density polyethylene of said principal material layer has a density of 0.93 to 0.97 g/cm$^3$ and a melt flow rate of 0.01 to 50 g/10minutes.

18. A multi-layer laminated structure according to claim 14, wherein said barrier layer is at least one material selected from a group consisting of saponified products of ethylene-vinyl acetate copolymers, polyamide resins, polyester resins and vinylidene chloride resins.

19. A multi-layer laminated structure according to claim 14, wherein an adhesion interface between said adhesive resin composition layer and/or a regrind layer, and said barrier layer is formed as an irregular surface.

20. A multi-layer laminated structure according to claim 19, wherein viewing an interface structure of said multi-layer laminated structure with a transmission electron microscope at a magnification within a range from 20,000× to 50,000× reveals irregularities with an elevation difference of at least 100 nm.

21. A multi-layer laminated structure according to claim 19, wherein said barrier layer is formed from a saponified product of an ethylene-vinyl acetate copolymer.

22. A vessel formed from a multi-layer laminated structure according to claim 14.

23. A vessel according to claim 22, which is a blow vessel selected from a group consisting of a fuel tank, a food vessel, and an industrial chemical vessel.

24. An adhesive resin composition according to claim 1, wherein said adhesive resin composition (III) comprises:

(a) 85 to 15% by mass of a modified high density polyethylene with a melt flow rate of 0.1 to 2.0 g/10 minutes, and a density of 0.93 to 0.96 g/cm$^3$, and (b') 15 to 85% by mass of an unmodified high density polyethylene with a melt flow rate of 0.1 to 20 g/10 minutes, and a density of 0.93 to 0.96 g/cm$^3$, wherein said adhesive resin composition (III) further comprises (C") 5 to 60% by mass of a modified and/or unmodified linear low density polyethylene with a melt flow rate of 0.1 to 20 g/10 minutes, and a density of 0.91 or greater and less than 0.93 g/cm$^3$, and/or (d") 5 to 40% by mass of a modified and/or unmodified ultra low density polyethylene with a melt flow rate of 0.1 to 20 g/10 minutes, and a density of 0.86 to 0.91 g/cm$^3$, and (a)+(b ')+(c")+(d") totals 100% by mass, and said linear low density polyethylene (c") and/or said ultra low density polyethylene (d") are ethylene/ct-olefin copolymer which is produced using a single site catalyst.

25. An adhesive resin composition according to claim 1, wherein said linear low density polyethylene (c) and/or (c') and/or said ultra low density polyethylene (d') have a plurality of peaks in an elution temperature vs. elution quantity curve obtained by a temperature rising elution fractionation (TREF) method, and the highest temperature peak among the plurality of peaks is within a range from 85° C. to 100° C.

26. An adhesive resin composition according to claim 1, wherein said linear low density polyethylene (c) and/or (c') and/or said ultra low density polyethylene (d') are ethylene/ci-olefin copolymer which is polymerized with a catalyst obtained by mixing the compounds alto a4 described below:

(a1): a compound represented by a general formula $Me_1R^1_pR^2_q(OR^3)_rX^1_{4-p-q-r}$ wherein, $Me^1$ represents zirconium, titanium or hafnium; $R^1$ and $R^3$ each represent a hydrocarbon group of 1 to 24 carbon atoms; R represents a 2,4-pentanedionato ligand or a derivative thereof, a benzoylmethanato ligand, or a benzoylacetonato ligand or a derivative thereof; $X^1$ represents a halogen atom; and p, q and r each represent integers which satisfy the ranges $0 \leq p \leq 4$, $0 \leq q \leq 4$, $0 \leq r \leq 4$, and $0 \leq p+q+r \leq 4$;

(a2): a compound represented by a general formula $Me_2R^4_{m(OR^5)_n}X^2_{z-m-n}$ wherein, $Me^2$ represents an element from group 1 to group 3 of the periodic table; $R^4$ and $R^5$ each represent a hydrocarbon group of 1 to 24 carbon atoms; $X^2$ represents a halogen atom or a hydrogen atom (although if $X^2$ is a hydrogen atom, then $Me^2$ can only be an element from group 3 of the periodic table); z represents the valency of $Me^2$, and m and n each represent integers which satisfy the ranges $0 \leq m \leq z$, $0 \leq n \leq z$, and moreover $0 \leq m+n \leq z$;

(a3): an organic cyclic compound with a conjugated double bond; and (a4): a modified organic aluminum oxy compound incorporating a Al—O—Al linkage and/or a boron compound.

27. An adhesive resin composition according to claim 24, wherein said linear low density polyethylene (c) andlor (c') and/or said ultra low density polyethylene (d') have a plurality of peaks in an elution temperature vs. elution quantity curve obtained by a temperature rising elution fractionation (TREF) method, and the highest temperature peak among the plurality of peaks is within a range from 85° C. to 100° C.

28. An adhesive resin composition according to claim 24, wherein said linear low density polyethylene (c) and/or (c') and/or said ultra low density polyethylene (d') are ethylene/α-olefin copolymer which is polymerized with a catalyst obtained by mixing the compounds alto a4 described below:

(a 1): a compound represented by a general formula $Me_1R^1_pR^2_q(OR^3)_rX^1_{4-p-q-r}$ wherein, $Me^1$ represents zirconium, titanium or hafnium; $R^1$ and $R^3$ each represent a hydrocarbon group of 1 to 24 carbon atoms; $R^2$ represents a 2,4-pentanedionato ligand or a derivative thereof, a benzoylmethanato ligand, or a benzoylacetonato ligand or a derivative thereof; $X^1$ represents a halogen atom; and p, q and r each represent integers which satisfy the ranges $0 \leq p \leq 4$, $0 \leq q \leq 4$, $0 \leq r \leq 4$, and $0 \leq p+q+r \leq 4$;

(a2): a compound represented by a general formula $Me_2R^4_m(OR^5)_nX^2_{z-m-n}$ wherein, $Me^2$ represents an element from group 1 to group 3 of the periodic table; $R^4$ and $R^5$ each represent a hydrocarbon group of 1 to 24 carbon atoms; $X^2$ represents a halogen atom or a hydrogen atom (although if $X^2$ is a hydrogen atom, then $Me^2$ can only be an element from group 3 of the periodic table); z represents the valency of $Me^2$, and m and n each represent integers which satisfy the ranges $0 \leq m \leq z$, $0 \leq n \leq z$, and moreover $0 \leq m+n \leq z$;

(a3): an organic cyclic compound with a conjugated double bond; and (a4): a modified organic aluminum oxy compound incorporating a Al—O—Al linkage and/or a boron compound.

29. An adhesive resin composition according to claim 1, wherein said unmodified linear low density polyethylene (c') and/or said unmodified ultra low density polyethylene (d') are ethylene/α-olefin copolymer which is produced using a single site catalyst.

30. An adhesive resin composition (III) according to claim 1, wherein the modified polyethylene (I) is the modified high density polyethylene (a) with a melt flow rate of 0.1 to 2.0 g/10 minutes, and a density of 0.93 to 0.96 g/cm³, and wherein the unmodified polyethylene (II) is a mixture of the unmodified high density polyethylene (b') with a melt flow rate of 0.1 to 20 g/10 minutes, and a density of 0.93 to 0.96 g/cm³, the unmodified linear low density polyethylene (c') with a melt flow rate of 0.1 to 20 g/10 minutes, and a density of 0.91 or greater and less than 0.93 g/cm³, and the unmodified ultra low density polyethylene (d') with a melt flow rate of 0.1 to 20 g/10 minutes, and a density of 0.86 to 0.91 g/cm³, and (a)+(b')+(c')+(d') totals 100% by mass.

31. An adhesive resin composition (III) according to claim 1, wherein the modified polyethylene (I) is the modified linear low density polyethylene (c) with a melt flow rate of 0.1 to 20 g/10 minutes, and a density of 0.91 or greater and less than 0.93 g/cm³, and wherein the unmodified polyethylene (II) is a mixture of the unmodified high density polyethylene (b') with a melt flow rate of 0.1 to 20 g/10 minutes, and a density of 0.93 to 0.96 g/cm³, the unmodified linear low density polyethylene (c') with a melt flow rate of 0.1 to 20 g/10 minutes, and a density of 0.91 or greater and less than 0.93 g/cm³, and the unmodified ultra low density polyethylene (d') with a melt flow rate of 0.1 to 20 g/10 minutes, and a density of 0.86 to 0.91 g/cm³, and (c)+(b')+(c')+(d') totals 100% by mass.

32. An adhesive resin composition (III) according to claim 1, wherein the modified polyethylene (I) is a mixture of the modified high density polyethylene (a) with a melt flow rate of 0.1 to 2.0 g/10 minutes, and a density of 0.93 to 0.96 g/cm³, and the modified linear low density polyethylene (c) with a melt flow rate of 0.1 to 20 g/10 minutes, and a density of 0.91 or greater and less than 0.93 g/cm³, and wherein the unmodified polyethylene (II) is a mixture of the unmodified high density polyethylene (b') with a melt flow rate of 0.1 to 20 g/10 minutes, and a density of 0.93 to 0.96 g/cm³, the unmodified linear low density polyethylene (c') with a melt flow rate of 0.1 to 20 g/10 minutes, and a density of 0.91 or greater and less than 0.93 g/cm³, and the unmodified ultra low density polyethylene (d') with a melt flow rate of 0.1 to 20 g/10 minutes, and a density of 0.86 to 0.91 g/cm³, and (a)+(c)+(b')+(c')+(d') totals 100% by mass.

* * * * *